United States Patent [19]
Takato et al.

[11] Patent Number: 4,827,503
[45] Date of Patent: May 2, 1989

[54] INTEGRATED RINGING CIRCUIT AND A RING TRIP CIRCUIT FOR THE SAME

[75] Inventors: Kenji Takato, Kawasaki; Kazumi Kinoshita, Yokohama; Toshiro Tojo; Yuzo Yamamoto, both of Kawasaki, all of Japan

[73] Assignee: Fujitsu Limited, Kanagawa, Japan

[21] Appl. No.: 110,460

[22] Filed: Oct. 20, 1987

[30] Foreign Application Priority Data

| Oct. 20, 1986 | [JP] | Japan | 61-247321 |
| Oct. 20, 1986 | [JP] | Japan | 61-247324 |
| Oct. 29, 1986 | [JP] | Japan | 61-255876 |
| Oct. 29, 1986 | [JP] | Japan | 61-255877 |

[51] Int. Cl.$^4$ .................................................. H04M 1/66
[52] U.S. Cl. ................................. 379/373; 379/375; 379/418
[58] Field of Search ............... 379/372, 373, 377, 379, 379/382, 385, 387, 399, 402, 405, 413, 418

[56] References Cited

U.S. PATENT DOCUMENTS

| 4,239,935 | 12/1980 | Bosik et al. | 379/373 |
| 4,276,448 | 6/1981 | Embree et al. | 379/375 |
| 4,310,733 | 1/1982 | Schoofs | 379/418 X |

*Primary Examiner*—Steven Mottola
*Attorney, Agent, or Firm*—Staas & Halsey

[57] ABSTRACT

A constant current circuit, including a constant current source which draws a current and a constant current source which sends a current, is connected to a two-wire subscriber line. A ringing signal made up of constant stream of positive and negative current signals is transmitted to the telephone line. The OFF-hook condition of a telephone set is detected by comparing the output voltage of a constant current circuit with a reference voltage for ring trip.

14 Claims, 20 Drawing Sheets

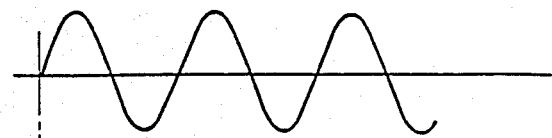
FIG. 7(a)
FIG. 7(b)     $I_0$
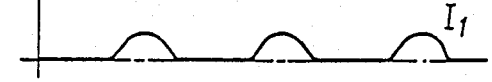
FIG. 7(c)     $I_1$
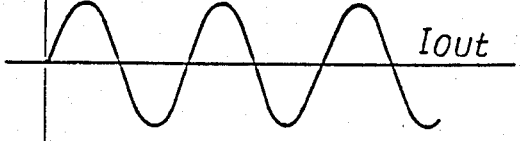
FIG. 7(d)     $I_{out}$
FIG. 7(e)
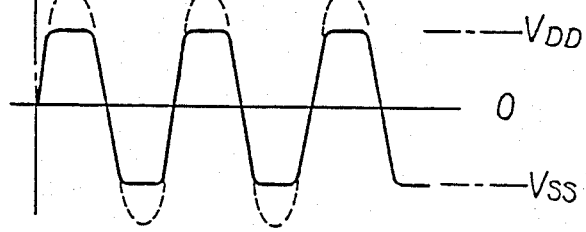
FIG. 7(f)
— $V_{DD}$
0
— $V_{SS}$

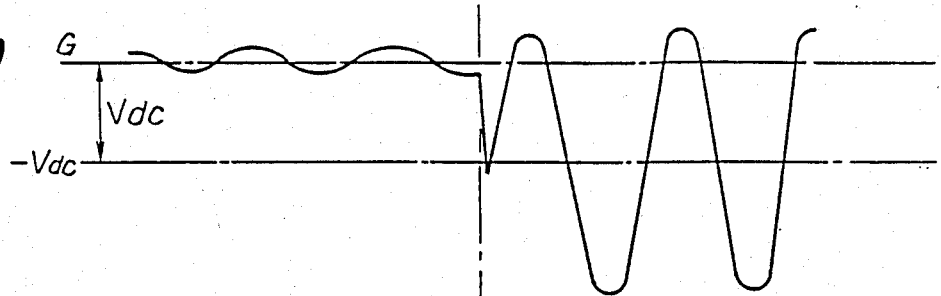
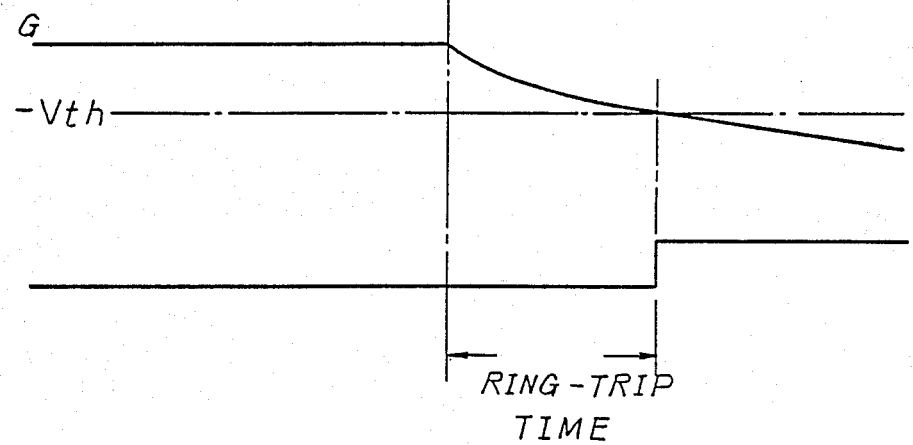
FIG. 11(a)
FIG. 11(b)
FIG. 11(c)
RING-TRIP TIME $I_0$ $I_1$ $I_{10}$ $I_{11}$

—·—·— $V_{DD}$

——— $V_{SS}$

——— $V_{DD}$

—·—·— $V_{SS}$

INTEGRATED RINGING CIRCUIT AND A RING TRIP CIRCUIT FOR THE SAME

BACKGROUND OF THE INVENTION

1. Field of the Invention

The present invention relates to a subscriber circuit of a digital switching system and particularly to a ringing circuit and ring trip circuit suited for an LSI.

2. Description of the Related Art

Subscriber circuits are known which provide a so-called BORSCHT function, including Battery feed, Overvoltage protection, Ringing (transmission of ringing signal), Supervision (supervision of line), Codec (coding and decoding), Hybrid (2-wire to 4-wire conversion) and Testing. The subscriber circuits correspond to respective subscriber lines and the hardware and the digital switching equipment used with the subscriber circuits can be reduced in size by forming the circuits on an LSI.

The present invention performs the ringing function (Ringing) of the BORSCHT functions. The ringing signal, which rings a bell of a subscriber telephone set to inform a user of receipt of a call, is transmitted from a ringing circuit, at a specified intermittent ratio, as an AC voltage with a frequency of about 16 Hz-20 Hz and an effective voltage of about 75 V.

FIG. 1 is a schematic diagram of an existing ringing circuit. BSHC circuit 3 performs the B (battery feed), S (supervision), H (hybrid) and C (codec) functions of the BORSCHT functions. The O (overvoltage protection) function, not covered by the BSHC function circuit 3, is performed by varistors dispersed throughout the ringing circuit, while the T (testing) function is performed by connecting a separate testing device and is not directly related to the ringing signal transmission. The R (ringing) function is accomplished by the ringing signal oscillator 5 and the contacts r1 and r2 of a relay (not shown). The ringing signal oscillator 5 and DC power supply 6 are used in common for a plurality of subscriber circuits 2.

When the contacts r1 and r2 are set to the positions indicated in FIG. 1, the ringing signal from the ringing signal oscillator 5 by-passes bell 1' of telephone set 1 through the resistors R10 and R11. A DC voltage supplied from the DC power supply 6 is also applied to the ringing signal oscillator 5. Therefore, when the telephone set 1 is in an OFF-hook state and a ringing signal is produced, a hook switch 1" closes, resulting in a short-circuit condition across hook switch 1", and a DC current from the DC power supply 6 flows through the hook switch 1". As a result, the OFF-hook state can be detected by detection of the DC current. Detection of the OFF-hook state causes the relay (not illustrated) to operate, changing the position of the contacts r1 and r2 to suspend transmission of the ringing signal and connect the telephone set 1 to the network 4 through the circuit 3. In this case, a DC current from the DC power supply 6 is limited by a sum of the resistors R10, R11 and the resistance of the subscriber line.

The DC power supply 6 can be provided, as shown, adjacent to resistor R10 and ringing signal oscillator 5, or it can be provided adjacent to resistor R11.

FIG. 2 and FIG. 3 are known circuits that have been used for sending a ringing signal superimposed on a DC voltage to a subscriber telephone set. In FIG. 2, a frequency of 16 Hz, for example, is supplied from the oscillator 53 and amplified by amplifier 52. The amplified signal is then supplied to a primary winding of transformer 51 having a winding ratio of 1:n to induce a voltage of about 75 V (effective value) at a secondary winding. A DC voltage from the DC power supply is then superimposed on the 75 V induced voltage and this combined voltage is transmitted to the subscriber telephone set through the contact r3. The circuit of FIG. 2 is connected in parallel to a plurality of subscriber lines a, b, c and therefore it requires a power supply of constant voltage utilizing a transformer. In this case, the transformer 51 must be large because it is required to boost a low frequency signal and permit a flow of DC current in the secondary coil.

FIG. 3 illustrates a structure for realizing a reduction in size of the transformer 51' used in FIG. 2. A center tap is provided on the primary winding of the transformer 51 and a current is alternately applied to the windings on both sides of the center tap. A signal of 16 Hz, for example, is supplied from the oscillator 56 to the bases of transistors 58 and 59 through non-inverting driver 54 and inverting driver 55 to alternately switch the transistors 58 and 59 ON and OFF. A current is supplied from the power supply 57 connected to the center tap of primary winding, which has a winding ratio of 1:n. A DC voltage supplied from the DC power supply 6 is superimposed on the voltage induced at the secondary winding and this combined voltage is supplied to the subscriber telephone set through the contact r4.

The ringing circuits of the prior art utilize transformers 51 or 51', which boost the voltage of a low frequency signal of about 16 Hz-25 Hz. These transformers must be large to couple signals of such a low frequency. Since a DC current is superimposed for detection of the OFF-hook state of a subscriber telephone set, a DC current flows to transformers 51 and 51'. Therefore the cores of transformers 51 and 51' do not exhibit magnetic saturation due to this DC current. As a result, the cores are also large in size. Thus, since the transformers 51 and 51' are heavy and large in size, the circuits that they are used in are also heavy and large.

The ringing circuit of the prior art utilizes a constant voltage source. Therefore, the current limiting resistors R10 and R11 are necessary to prevent an over-current condition across the short-circuited switch 1" caused by the OFF-hook state. Resistors R10 and R11 must have power ratings of several watts to accommodate the heat generated by current flowing during the OFF-hook state of a telephone set and the heat generated by current due to the grounding of the subscriber line. Therefore such a ringing circuit results in a disadvantage that a large circuit area is required.

Switching equipment tends to distribute the equipment that performs various functions and as a result, the signal processors load, but since the ringing circuit is large in size as explained above, it is difficult to employ a distributed system architecture which divides its functions and allows distribution of components.

SUMMARY OF THE INVENTION

It is therefore an object of the present invention to provide a ringing circuit formed on an LSI producing a small and light weight subscriber circuit.

It is another object of the present invention to provide a ringing circuit formed on an LSI and producing a ringing circuit corresponding to each subscriber circuit in a distributed architecture.

It is a further object of the present invention to provide a ring trip circuit for the ringing circuit formed on an LSI.

The above objects can be accomplished by an integrated ringing circuit for transmitting a ringing signal to a subscriber telephone set via a pair of subscriber lines. The integrated ringing circuit comprises a first constant current source, which draws in a current from a subscriber line and a second constant current source which supplies a current to said subscriber line. The circuit further includes a reference signal source which outputs a clock signal at the ringing signal frequency, and a control circuit for alternately activating the first and second constant current sources corresponding to the signal from the reference signal source, and for transmitting the ringing signal to the subscriber telephone set.

The objects can also be accomplished by another embodiment in which first and second constant current sources are formed from current mirror circuits. In another embodiment, a ring trip circuit is provided with a first constant current source, which draws in current from a pair of subscriber lines, and a second constant current source which sends a current to the subscriber lines. A reference signal source outputs a clock signal of a frequency corresponding to a ringing signal frequency, and a control circuit alternately activates the first and second constant current sources and sends the ringing signal to a subscriber telephone set via said subscriber lines. A relay connects the first and second constant current source and the subscriber lines, a comparator compares output voltages of the first and second constant current sources with a reference voltage and outputs a control signal when the amplitude of the output voltage becomes small, and a counter starts counting upon receipt of a control signal from the comparator. A decision device decides whether the OFF-hook state exists by evaluating a counted value for the counter, and a logic circuit causes a change of state of the contacts of the relay when the OFF-hook is detected.

These together with other objects and advantages which will be subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 7(a), 7(b), 7(c), 7(d), 7(e) and 7(f) are graphs of waveforms produced by the circuit of FIG. 6;

FIGS. 11(a), 11(b) and 11(c) are graphs of waveforms associated with the circuit of FIG. 10;

DESCRIPTION OF THE PREFERRED EMBODIMENTS

Figure 4:
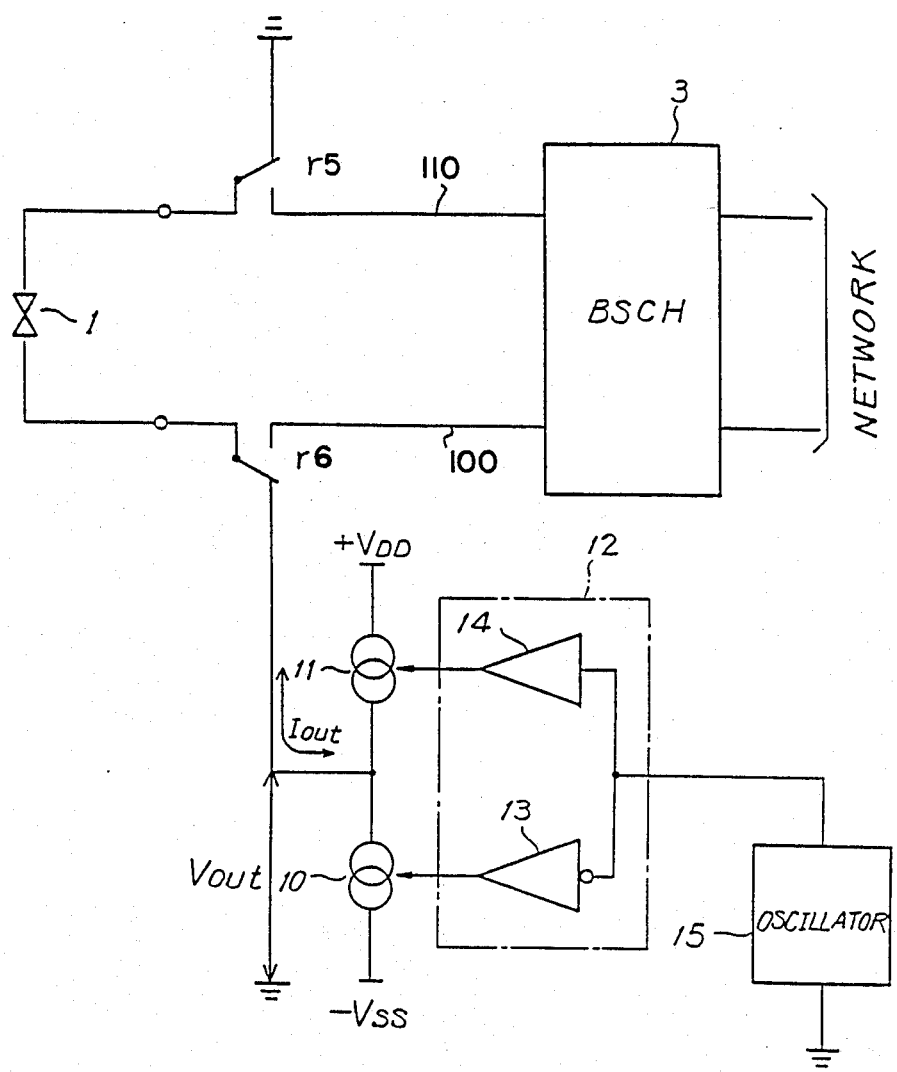
FIG. 4 is a circuit diagram of a ringing circuit according to the present invention.

FIG. 4 is a circuit diagram of a ringing circuit in accordance with the present invention. This circuit generates a sum of the currents from first and second constant current sources as the ringing signal. The ringing circuit includes a first constant current source 10, a second constant current source 11 and a control circuit 12 which sends the ringing signal to the subscriber telephone set 1 by alternately operating the first and second constant current sources 10 and 11 using the signal from the reference signal source 15. Control circuit 12 includes an inverting driver 13 and a non-inverting driver 14. The first constant current source 10 is connected to a power supply $-V_{SS}$ and the second constant current source 11 is connected to a power supply $+V_{DD}$. The connecting point of the first and second constant current sources 10 and 11 is also connected to the subscriber telephone set 1 through the contacts r5 and r6. BSHC circuit 3 performs the standard BSHC functions and telephone set 1 is connected to the network of switching equipment through BSHC circuit 3.

Control circuit 12 alternately operates the constant current sources 10 and 11 corresponding to the positive and negative polarities of the signal from the signal source 15. For instance, when the signal from the signal source 15 is negative, the control circuit 12 activates the first constant current source 10 and causes the power supply $-V_{SS}$ to draw current. On the other hand, when the signal from he signal source 15 is positive, control circuit 12 activates the second constant current source 11 and causes the power supply $+V_{DD}$ to send a current. When this occurs, a constant AC ringing signal current flows to the telephone set 1 and rings a bell.

Figure 5:
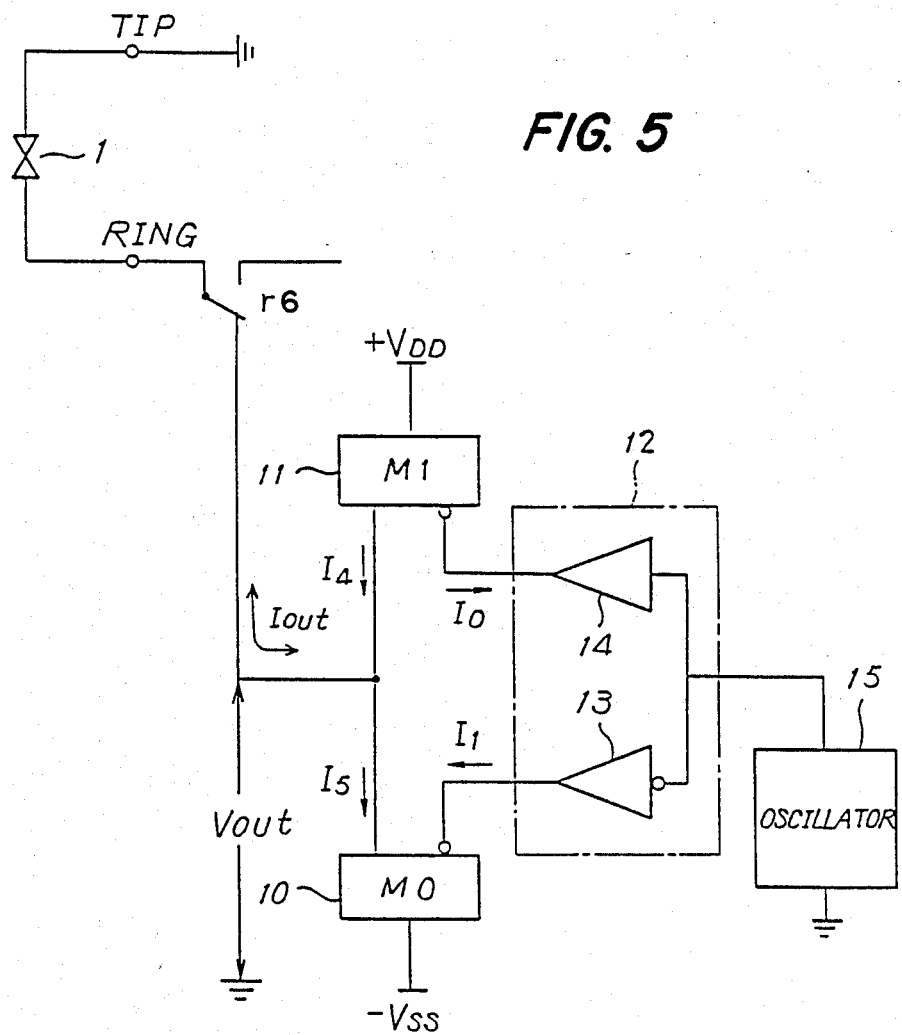
FIG. 5 is a block diagram of circuit of FIG. 4.

FIG. 5 is a block diagram detailing FIG. 4. Current mirror circuits are used as the first and second constant current sources. Terminal TIP is grounded, and contact r6 is connected to terminal RING. A signal of a frequency equal to that of the ringing signal is output from signal source 15. When this signal is negative, a current $I_1$ is supplied as the input to the current mirror circuit 10 from the inverting driver 13. The current mirror circuit 10 draws a current $I_5$ which is proportional to current $I_1$. When a signal sent from the signal source 15 is positive, a current $I_0$ is drawn as the input from the current mirror circuit 11 by non-inverting driver 14 and the current mirror circuit 11 produces a current $I_4$ proportional to the current $I_0$. Therefore, currents $I_5$ and $I_4$, which have constant values and are alternately inverse in direction, are supplied to telephone set 1 through the contact r6. An AC ringing signal is supplied through contact r6 and thereby a bell of telephone set 1 rings.

Output voltage $V_{out}$ corresponds to an impedance of the telephone set 1 and the subscriber line, however, the current supplied from the current mirror circuits 10 and 11 is constant regardless of the output voltage $V_{out}$. The current mirror circuits 10 and 11 are constant current sources with a high impedance. Output voltage $V_{out}$ does not exceed the power supply voltages $-V_{SS}$ and $+V_{DD}$. When in the OFF-hook state and when grounding of the subscriber line occurs, the current does not exceed a predetermined constant value due to the characteristics of the constant current circuit. Therefore, it is no longer necessary to provide a resistor for limiting the short-circuit current.

Figure 6:
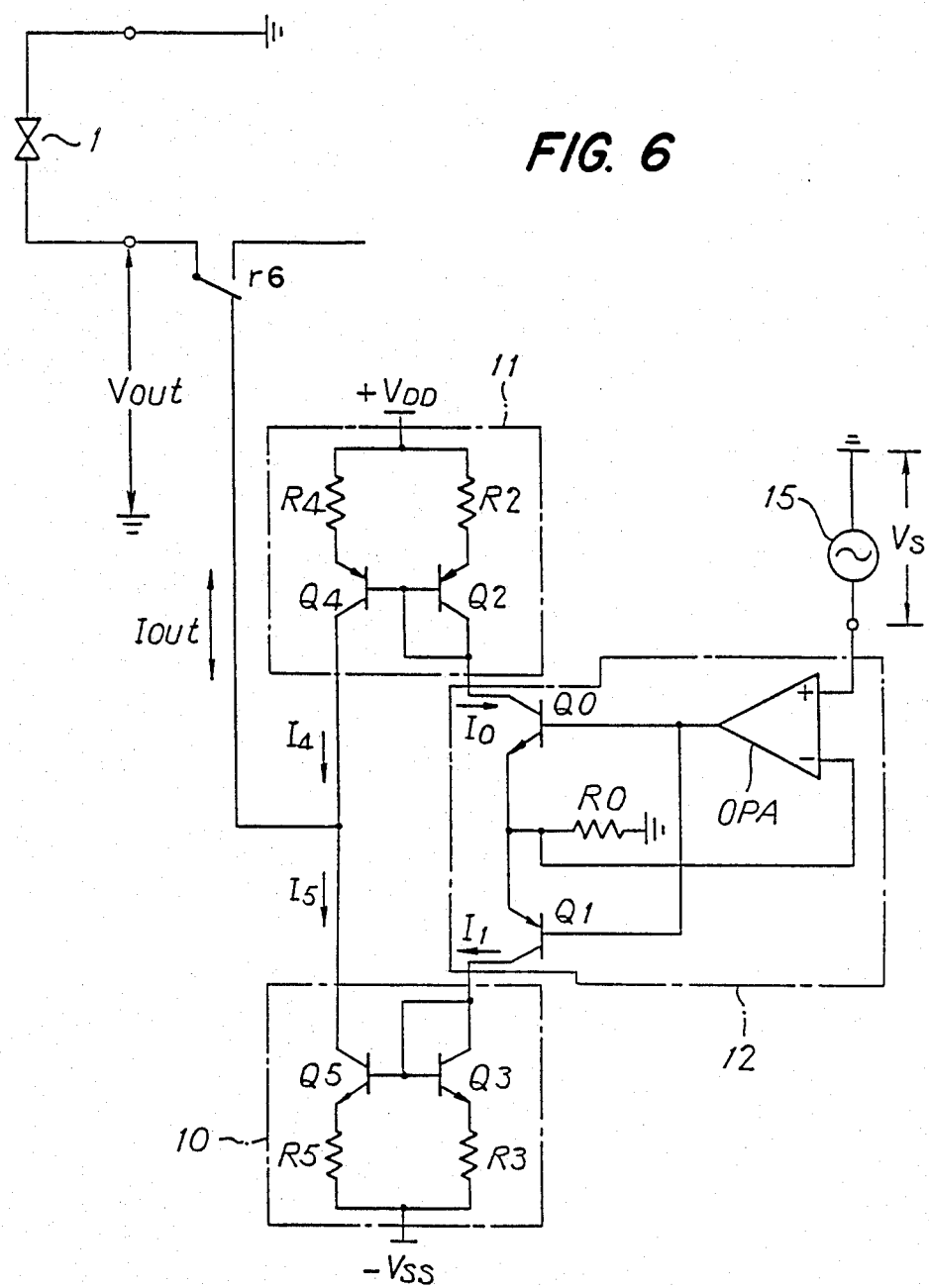
FIG. 6 is a detailed circuit diagram of FIG. 5.

FIG. 6 is a detailed circuit diagram of FIG. 5. The first current mirror circuit 10 includes transistors Q3, Q5 and resistors R3, R5, and the bases of transistors Q3, Q5 are connected to the collector of transistor Q3 on the input side of transistor Q3. The second current mirror circuit 11 is formed by the transistors Q2, Q4 and resistors R2, R4, and the bases of transistors Q2, Q4 are connected to the collector of transistor Q2 on the input side. The current mirror circuit generally has the structure shown, using a pair of transistors, but it can employ various other structures.

The control circuit 12 uses an operational amplifier OPA, transistors Q0, Q1 and a resistor R0. Signal source 15 is connected to the non-inverting input terminal (+) of the operational amplifier OPA, the bases of transistors Q0, Q1 are connected to the output terminal, and the inverting input terminal (−) of the operational amplifier OPA and the resistor R0 are connected to the emitters of transistors Q0, Q1. When the base-emitter voltages of transistors Q3, Q5 are equal and a current amplification coefficient $h_{FE}$ is sufficiently large, since $$R3\, I_1 = R5\, I_5 \qquad (1)$$

the relation between the input current $I_1$ and output current $I_5$ of the current mirror circuit 10 is expressed as follows:

$$I_5 = (R3/R5)\, I_1 \qquad (2)$$

Therefore, when $R3 > R5$, output current $I_5$ can be controlled with less input current $I_1$. In the same way, the relation $$I_4 = (R2/R4)\, I_0 \qquad (3)$$

can be produced in the current mirror circuit 11.

Since the operational amplifier OPA sets the signal voltage $V_S$ applied to the non-inverting input terminal (+) and the voltage applied to the inverting input terminal (−) to the same potential (imaginary shortcircuit), the emitter voltage of the transistors Q0, Q1 becomes equal to the signal voltage $V_S$. If the current amplification coefficient hFE of transistors Q0, Q1 is sufficiently large, when the signal voltage $V_S$ is positive, a current $I_0$ flowing into the transistor Q0 is expressed as follows:

$$I_0 = V_S/R0 \qquad (4)$$

While a current $I_1$ flowing into the transistor Q1 becomes 0. When the signal voltage $V_S$ is negative, the current $I_1$ flowing into the transistor Q1 is expressed as follows:

$$I_1 = V_S/R0 \qquad (5)$$

While the current $I_0$ is 0.

The signal voltage $V_S$ is selected to be a value less than the emitter-base break down voltage of the transistors Q0, Q1.

With the currents $I_1$ and $I_0$ corresponding to the polarity of signal voltage $V_S$, a sum of currents $I_5$ and $I_4$ multiplied by R3/R5 and R2/R4, respectively is supplied from the current mirror circuits 10 and 11 as the ringing signal current $I_{out}$ through the contact r6.

FIGS. 7(a)–7(f) are graphs of the various signals of the circuit of FIG. 6. 7(a) shows the voltage $V_S$ supplied from the signal source 15. This signal causes currents $I_0$, $I_1$ to flow into the transistors Q0, Q1 as indicated in 7(b) and 7(c). Since the currents $I_0$, $I_1$ are the input currents of the current mirror circuits 11, 10, the ringing signal current $I_{out}$ indicated in 7(d) is obtained. An output voltage $V_{out}$ is shown in FIG. 7(e). If a load impedance $Z_L$ is large, the output voltage $V_{out}$ tends to increase as indicated by the dotted line of FIG. 7(f), however, the output voltage cannot exceed the power supply voltages $+V_{DD}$, $-V_{SS}$ of the current mirror circuits 11, 10. In this situation, the transistors Q5, Q4 on the output side of current mirror circuits 10, 11 are saturated. Since the resistors R5, R4 are also selected to be of low resistance, they are connected to the power sources with low impedance and the output voltage $V_{out}$ is clamped within the power supply voltages $+V_{DD}$, $-V_{SS}$ as indicated by the solid line in FIG. 7(f).

Figure 8:
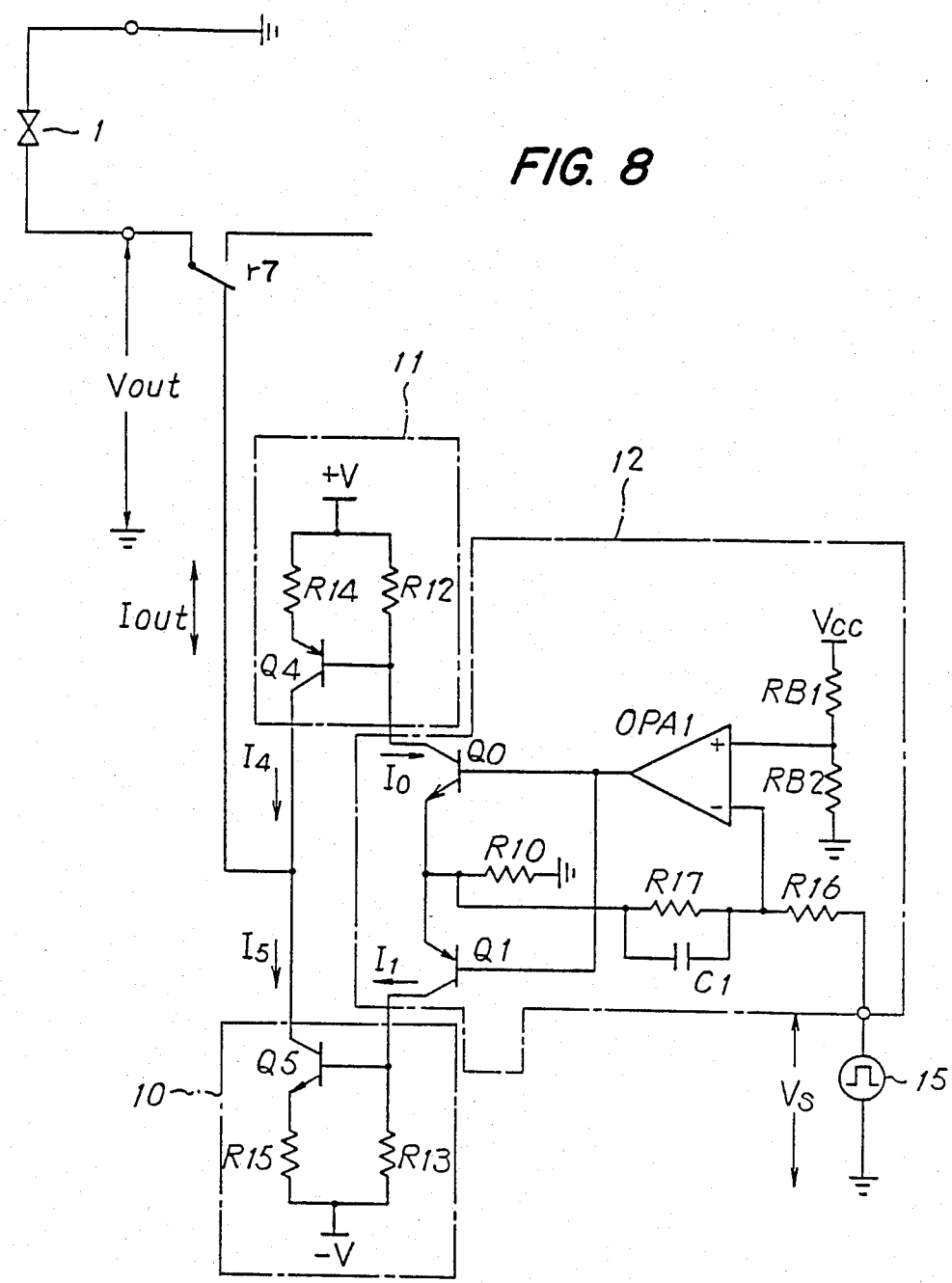
FIG. 8 is a circuit diagram of another embodiment of the present invention.

FIG. 8 is a schematic diagram of another embodiment of the present invention. This embodiment eliminates the transistors Q3, Q2 on the input side of the current mirror circuits 10, 11. The current mirror circuit 10 is formed using transistor Q5 and resistors R13, R15, and the current mirror circuit 11 using the transistor Q4 and resistors R12, R14. If the base-emitter voltage of the transistors Q5, Q4 on the output side are $V_{BE5}$, $V_{BE4}$, respectively, the currents $I_5$, $I_4$ flowing into the transistors Q5, Q4 in the output side caused by the power supply voltages $-V$, $+V$ are, respectively, expressed as follows:

$$I_5 = (I_1 R13 - V_{BE5})/R15 \qquad (7)$$

$$I_4 = (I_0 R12 - V_{BE4})/R14 \qquad (8)$$

where a current amplification coefficient $h_{FE}$ of the transistors is considered sufficiently large. Here, an error factor in the base-emitter voltage $V_{BE5}$, $V_{BE4}$ is small and values of $I_4$, $I_5$ can be determined by resistors R12, R14, R13, R15. Accordingly, since the transistor on the input side can be eliminated, an economical structure can be formed in comparison with the current mirror circuit of FIG. 6 and sufficient characteristics for practical use can also be attained. In this embodiment, the signal from the signal source 15 is a pulse logic signal (square wave) and therefore the control circuit 12 is formed corresponding to handle such a signal. The control circuit 12 includes operational amplifier OPA1, transistors Q0, Q1, resistors R10, R16, R17, RB1, RB2 and a capacitor C1. The voltage $V_{CC}$ is divided by the resistors RB1, RB2. The divided voltage is applied to the non-inverting input terminal (+) of the operational amplifier OPA1 and the signal 0 from the signal source 15 to the inverting input terminal (−) of the operational amplifier OPA1 passes through the resistor R16. If the signal from this signal source 15 is the ringing signal, consisting of potentials 0 and $V_{CC}$, a voltage generated at the resistor R10 will have the amplitude of $\pm V_{CC}/2$ when the value of the resistors are such that RB1/RB2=3/1 and R16=R17. This voltage will result in the currents $I_0$, $I_1$ flowing into the transistors Q0, Q1, and the ringing signal current $I_{out}$, which is a sum of the currents $I_5$, $I_4$ from the current mirror circuits 10, 11, is transmitted to the telephone set 1 through the contact r7. The capacitor C1 and resistors R16, R17 form an integral circuit and a voltage generated across the resistor R10 is a deformed waveform. Thus, the ringing signal current waveform can be approximated as a sine wave.

Figure 9A:
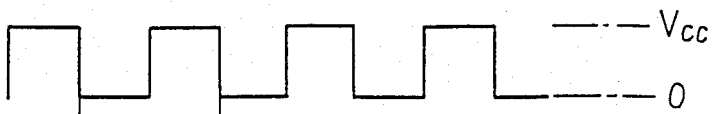
FIGS. 9(a), 9(b), 9(c), 9(d), 9(e) and 9(f) are graphs of waveforms associated with the circuit of FIG. 8.
Figure 9B:
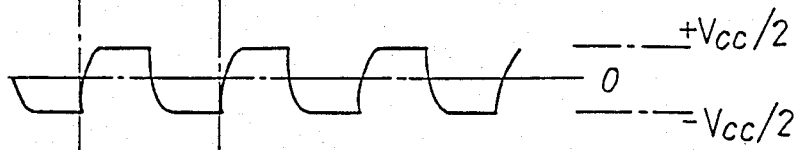
Figure 9C:
Figure 9D:
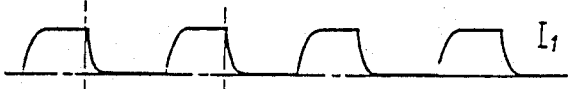
Figure 9E:
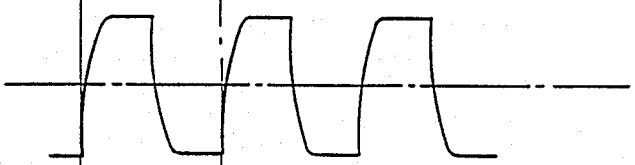
Figure 9F:
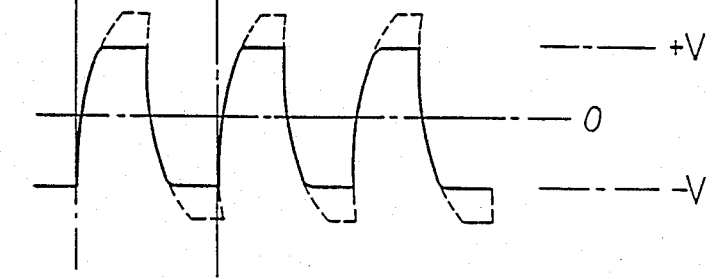

FIGS. 9(a)-9(f) are graphs of signals associated with the operation of the circuit of FIG. 8. FIG. 9(a) shows the pulse signal from the signal source 15 consisting of the potentials 0 and $V_{CC}$. This signal is applied to the inverting input terminal (−) of the operational amplifier OPA1 through the resistor R16 and the voltage $V_{CC}$ is divided by the resistors RB1, RB2 and is applied to the non-inverting input terminal (+) of the operational amplifier OPA1. In the operational amplifier OPA1, an output signal corresponding to the difference between $V_{CC}/4$ applied to the non-inverting input terminal (−) is applied to the bases of transistors Q0, Q1 and a voltage with amplitude of $\pm V_{CC}/2$, as shown in FIG. 9(b), is generated on the resistor R10. The currents $I_0$, $I_1$, corresponding to such voltage, flow into the transistors Q0, Q1 as indicated in FIGS. 9(c) and 9(d). These currents $I_0$, $I_1$ are the input currents as the previous embodiment. The currents $I_5$, $I_4$ are output from the current mirror circuits 10, 11 and the ringing signal current $I_{out}$, which is the sum of $I_5$ and $I_4$, is supplied to the telephone set 1 through the relay contact r7. Thus, the output voltages $V_{out}$ indicated in FIGS. 9(e) and 9(f) are produced. The output voltage shown in FIG. 9(f) has a large load impedance and is clamped at the power supply voltages $+V_{DD}$ and $-V_{SS}$ even if the output voltage $V_{out}$ tends to increase as indicated by the dotted line.

As explained above, the ringing signal can be transmitted by alternately operating the first and second constant current source 10 and 11. No transformer is needed, unlike the circuits of the prior art. Accordingly, the structure of the present invention can be formed small in size and light in weight. The use of constant current sources 10 and 11 prevents the flow of excessive current during the OFF-hook and grounded states. This provides safe operation and also realizes economical construction and reduction in size through elimination of the current limiting resistors. In addition, it is possible to realize function distribution by providing the ringing circuits corresponding to subscriber lines because the ringing current can be easily formed as an integrated circuit, also providing improved system reliability.

The ring trip circuit of FIGS. 4, 5, 6 and 8 are described below.

Figure 1:
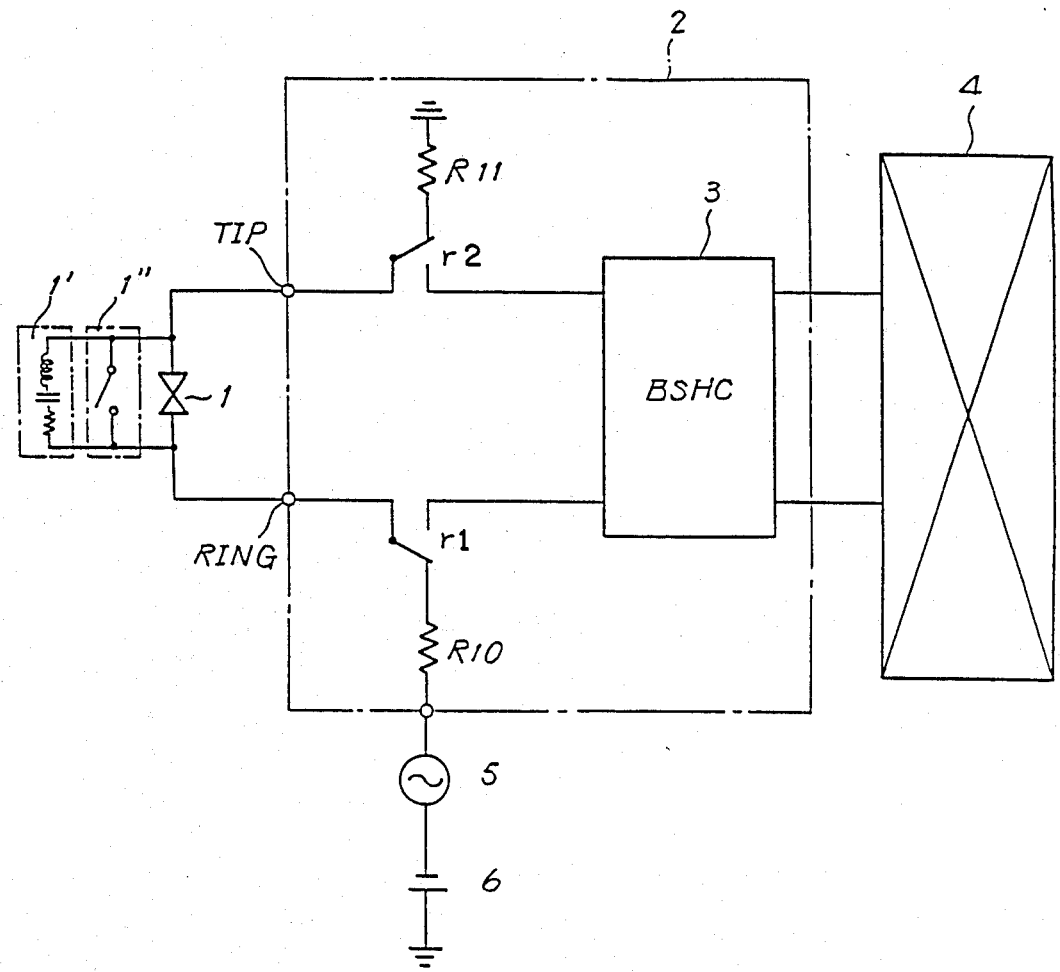
FIG. 1 is a schematic diagram of a prior art ringing circuit.
Figure 2:
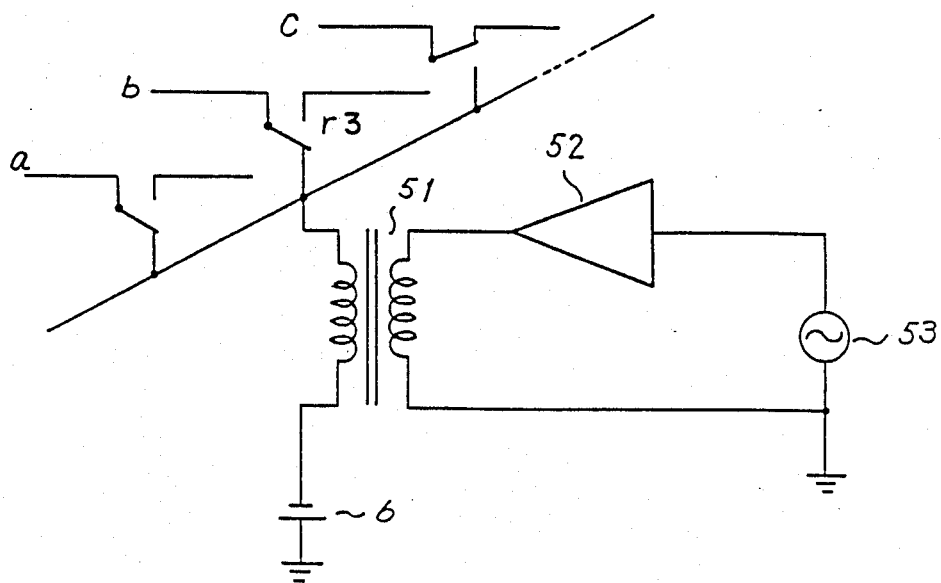
FIG. 2 is a circuit diagram of a prior art ringing circuit.
Figure 3:
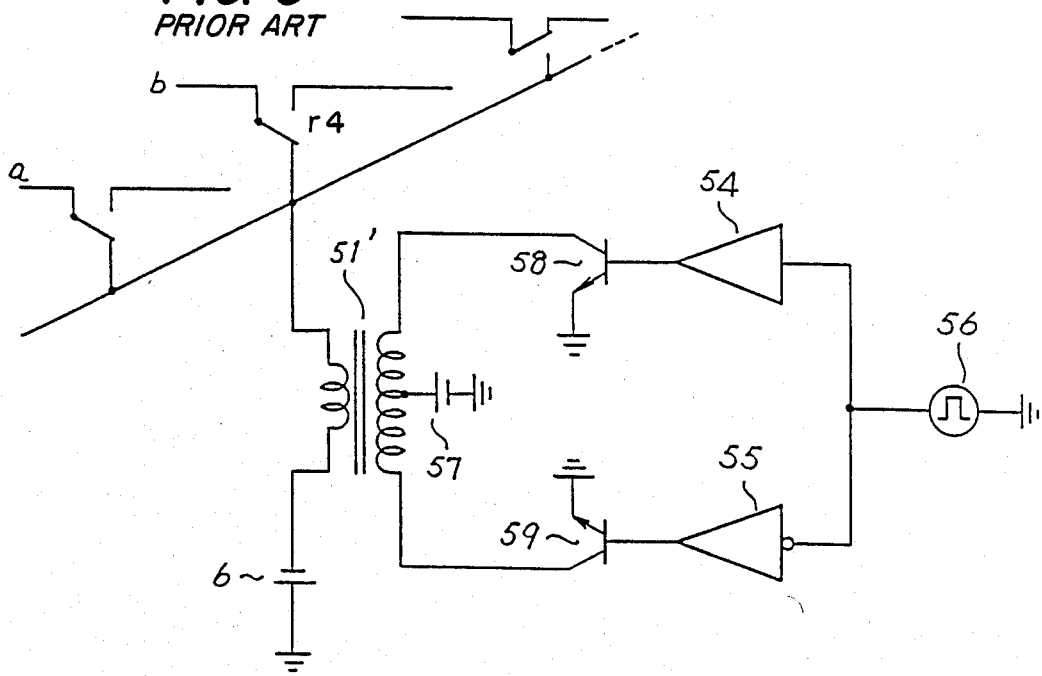
FIG. 3 is a circuit diagram of a prior art ringing circuit.

As explained previously, when the ringing signal is transmitted to the call destination telephone set and the OFF-hook state is entered in response to the ringing signal, transmission of the ringing signal is suspended and the call destination telephone set and the call originating telephone set are connected through the network switching equipment. The circuit which detects the OFF-hook state in response to the ringing signal, outputs a control signal for suspending the ringing signal called a ring trip signal. The ringing circuit is turned off in response to the ring trip signal. The ring trip circuit corresponding to the ringing circuit indicated in FIGS. 1, 2 and 3 is explained with reference to FIG. 10.

Figure 10:
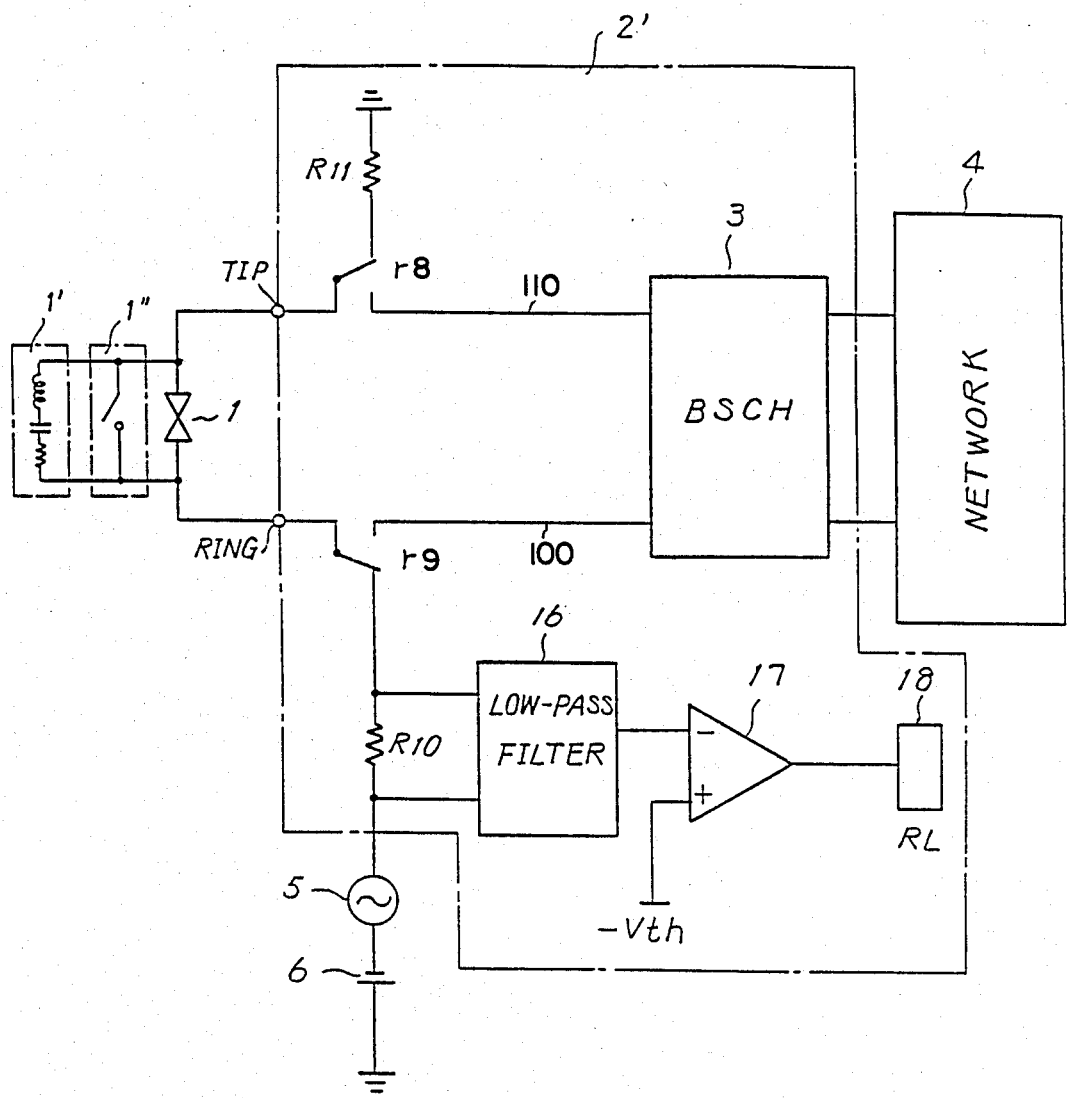
FIG. 10 is a circuit diagram of a prior art ring trip circuit.

In FIG. 10, ring signal generator 5 and DC power source 6 are commonly provided to a plurality of subscriber circuits 2' and the resistor R10, low-pass-filter 16 and comparator 17 which form the ring trip circuit are provided for each subscriber circuit. The relay RL 18 operates via a loop (not illustrated) coupled to the ringing control signal, setting the contacts r8 and r9 to the positions indicated in FIG. 10. Accordingly, a ringing signal, having an effective value of 75 V and a frequency of 16 Hz, is transmitted by the ringing signal generator 5 to the telephone set 1 through the resistor R10 and contact r9. The signal is then grounded through the contact r8 and resistor R11. A DC voltage from the DC power supply 6 is superimposed on the ringing signal and, if the telephone set 1 is in the ON-hook state, the telephone set 1 becomes equivalent to a series circuit 1' (resistor R, capacitor C and inductor L), having a high impedance path. When the telephone set 1 is in the OFF-hook state, it is equivalent to the condition where the hook switch 1'' closes and the series circuit 1' is short-circuited, resulting in a low impedance path. Therefore, the impedance and current flow differ in the ON-hook and OFF-hook states and, accordingly, the OFF-hook state can be detected by detecting a change of current as a voltage drop across resistor R10.

FIGS. 11(a)-11(c) are graphs showing signals associated with the operation of the circuit of FIG. 10. Since the impedance of telephone set 1 is large prior to the OFF-hook state, a DC current from DC power supply 6 is small and the ringing signal current from the ringing signal generator 5 is also small. As a result, a voltage generated across the resistor R10 becomes an AC voltage with a small amplitude and includes the DC level of 0 V (ground level G) as indicated in FIG. 11(a). Therefore, as indicated in FIG. 11(b), an output signal of the low-pass-filter 16 is at the ground level G, the small amplitude AC being eliminated, and becomes larger than the reference voltage $V_{th}$. The comparator 17 outputs the low level signal as indicated in FIG. 11(c), since the output signal level of low-pass-filter 16 is higher than the reference voltage $V_{th}$. Since the relay RL18 continues to operate, the ringing signal is transmitted to the telephone set 1 through the contact r9.

When the OFF-hook state is entered in response to the ringing signal, the impedance of telephone set 1 becomes small. As a result, a DC current from DC power supply 6 increases and the ringing signal current from the ringing signal generator 5 also increases. Thus, a voltage generated at resistor R10 changes to an AC component having a larger amplitude and including the DC level of $-V_{dc}$ as indicated by the waveform, shown in FIG. 11(a). Accordingly, the output signal level of low-pass-filter 16 is gradually lowered below the reference voltage $V_{th}$. When the output signal level of low-pass-filter 16 becomes lower than the reference voltage $V_{th}$ in the comparator 17, it outputs the high level signal as indicated in FIG. 11(c). Thereby the relay RL 18 is restored and the contacts r8 and r9 are switched, thus suspending transmission of the ringing signal. The telephone set 1 is connected to the network of switching equipment through the circuit 3, and the speech path is formed between the destination telephone set and the call originating telephone set.

As explained previously, the conventional ring trip circuit (resistor R10, low-pass-filter 16, comparator 17) detects a voltage drop across the resistor R10 during the OFF-hook state by utilizing the ringing signal generator 5 as a constant voltage source formed by a transformer.

However, as indicated in FIG. 4, FIG. 5, FIG. 6 and FIG. 8, the present invention transmits the ringing signal to the telephone set 1 using a constant current. Therefore, the telephone set 1 enters the OFF-hook state after the ON-hook state, changing its impedance. Since the ringing signal is a constant current, the change of impedance cannot be detected as a voltage drop by the resistor R10 in FIG. 10. In other words, it is impossible to use the conventional ring trip circuit as the ringing signal transmitting circuit of the present invention.

In FIG. 4 and FIG. 5, when a load impedance including the impedance of telephone set 1 is considered as $Z_L$, an output voltage $V_{out}$ is indicated as $$V_{out} = I_{out} Z_L \qquad (6)$$

However, this output voltage $V_{out}$ does not exceed the power supply voltages $+V_{DD}$, $-V_{SS}$. When the telephone set 1 goes into the OFF-hook state in response to the ringing signal, its impedance becomes zero and thereby the output voltage $V_{out}$ is lowered. Accordingly, the OFF-hook state can be detected by monitoring the output voltage $V_{out}$.

As previously explained, the ring trip circuit of the present invention detects the OFF-hook state by comparing the voltage at the origination point of the ringing signal with a reference voltage. This detecting operation is described below with reference to FIG. 12.

Figure 12:
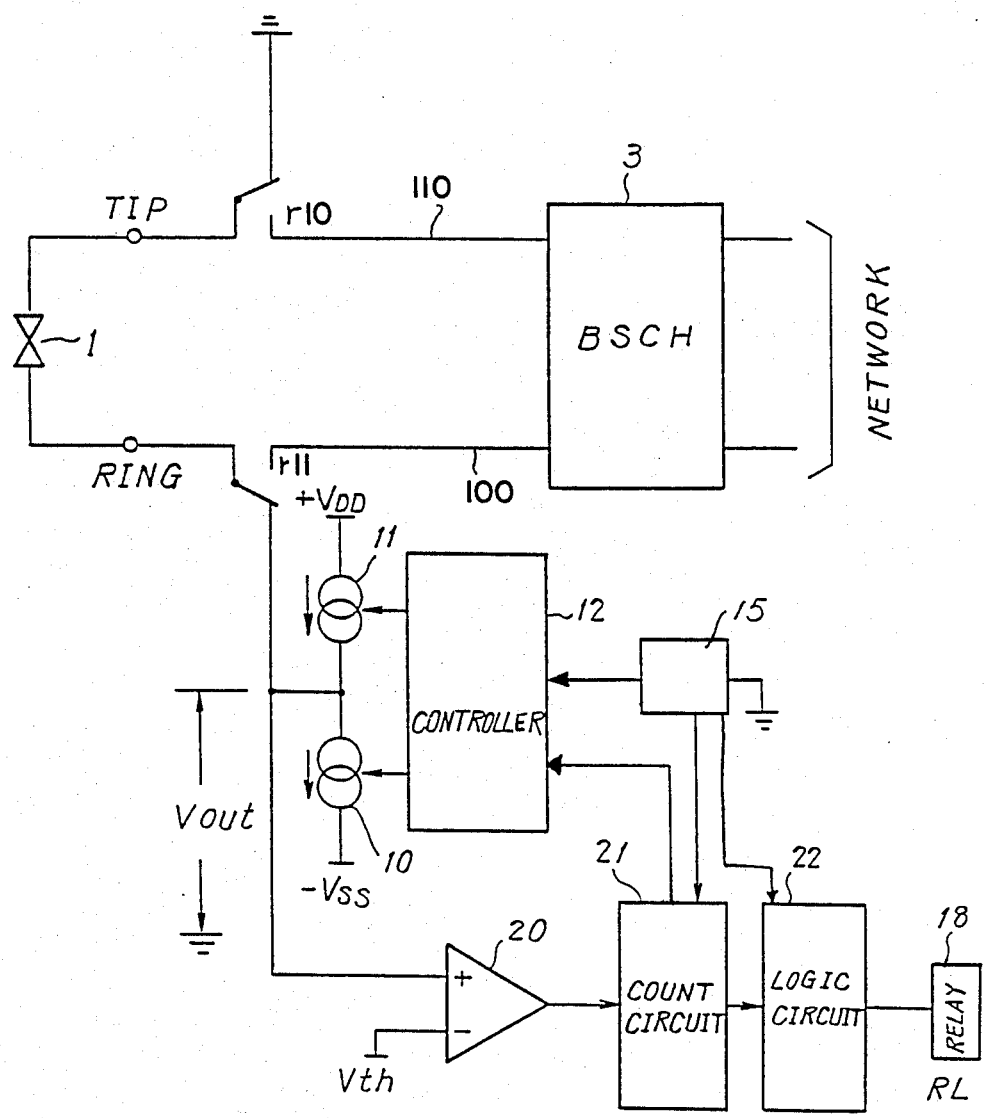
FIG. 12 is a block diagram of a ring trip circuit of the present invention.

FIG. 12 is a block diagram of a ring trip circuit of the present invention. In this structure, the ringing signal of the constant current is transmitted through the contacts r10 and r11 of relay RL18 via control of control circuit 12 by the constant current circuits 10 and 11. Constant current circuit 10 supplies current when the power supply voltage $-V_{SS}$ is applied to the subscriber telephone set 1 connected to the terminals TIP, RING through the subscriber line. The second constant current circuit 11 supplies current when the power supply voltage $+V_{DD}$ is applied. Comparator 20 compares the output voltage $V_{out}$ of the connecting point of the first and second constant current circuits 10, 11 with the reference voltage $V_{th}$ and produces a square wave digital type pulsed signal. Count circuit 21 receives pulses supplied by signal source 15. After a predetermined number of pulses, count circuit 21 outputs a reset signal to logic circuit 22. Logic circuit 22 determines whether the OFF-hook state exists or not depending on the content of count circuit 21, and changes the position of the contacts r10 and r11 of relay RL18 when the OFF-hook state is detected. The transmission of the ringing signal is suspended by changing the connection of the contacts r10 and r11, and the telephone set 1 is connected to the network switching equipment through the BSHC circuit 3. An output of the signal source 14 provides the clock signal for the count circuit 21.

Since the impedance of telephone set 1 during the ON-hook state is large, an output voltage $V_{out}$ of the ringing is also large. Since an impedance of telephone set 1 during the OFF-hook state is small, an output $V_{out}$ of the ringing signal is also small. The ON-hook or OFF-hook state can be detected by comparing the output voltage $V_{out}$ with the reference voltage $V_{th}$ in the comparator 20. When the comparison output signal from the control circuit 12 indicates the OFF-hook state, the counter circuit 21 counts the pulses from the signal source 15, and when such count value reaches a predetermined value, the logic circuit 22 realizes the existence of the OFF-hook state and changes the connection of contacts r10 and r11 of relay RL18. Since the contacts r10 and r11 are changed from the condition shown in FIG. 12, transmission of the ringing signal is suspended, and the telephone set 1 is connected to the network of switching equipment through the contact 41, and to the circuit 3 having the BSHC functions. This connects the speech path to the call originating telephone set.

Figure 13:
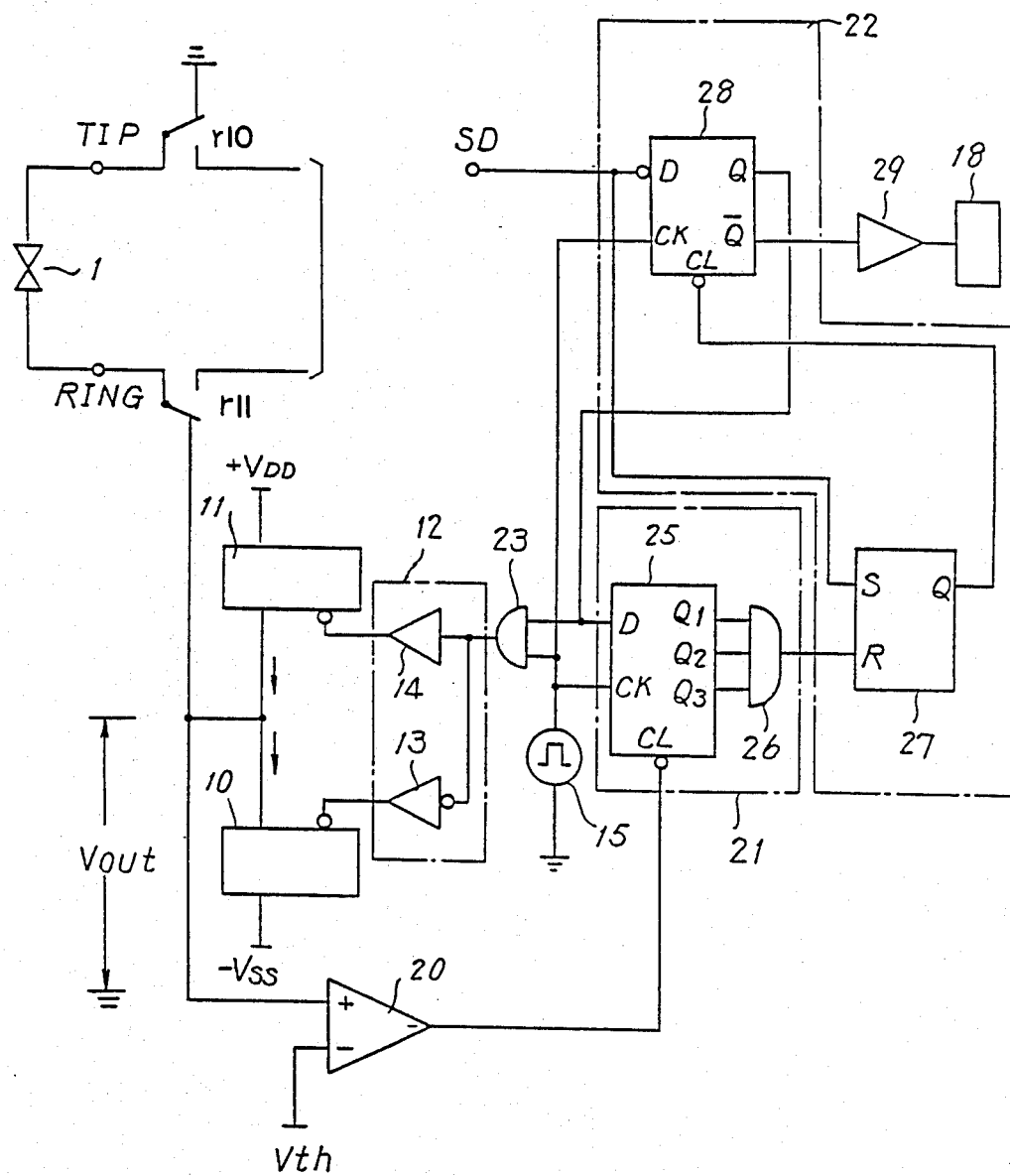
FIG. 13 is a detail circuit diagram of FIG. 12.

FIG. 13 is a detailed circuit diagram of the ring trip circuit of FIG. 12. In FIG. 13, the first and second constant current sources 10, 11 and the control circuit 12 are similar to those in FIG. 4 and FIG. 5. The comparator 20 compares the output voltage $V_{out}$ of the connecting point of the first constant current circuit 10 (to which the power supply voltage $-V_{SS}$ is applied) and the second constant current circuit 11 (to which the power supply voltage $-V_{DD}$ is applied) with the reference voltage $V_{th}$. The resulting comparison output signal is applied to the clear terminal CL of the shift register 25. The signal from the signal source 15 is applied to the clock terminal CK of shift register 25, clock terminal CK of flip-flop 28 and the AND circuit 23.

When the ringing signal is transmitted to the call terminating telephone set, the ringing control signal SD supplied by the switching equipment becomes "0" and this ringing control signal SD is applied to the data terminal D of flip-flop 28 and the set terminal S of flip-flop 27. The Q terminal output signal of flip-flop 28 is applied to the data terminal D of shift register 25 and the AND circuit 23, while the $\overline{Q}$ terminal output signal of flip-flop 28 is amplified by the amplifier 29 and is then applied to the relay RL18. When the ringing signal is not being transmitted, the ringing control signal SD is "1" and the Q terminal output signal of the flip-flop 28 becomes "1". In this case, the relay RL18 is actuated and the contacts r10 and r11 change from the position indicated in FIG. 13. Moreover, since the flip-flop 27 is set and its Q terminal output becomes "1", 0 is input to the clear terminal CL of the flip-flop 28. Accordingly, the Q terminal outputs of flip-flop 28 are held unchanged. When a call is terminated at the telephone set 1 and the ringing control signal SD becomes "0", the flip-flop 28 is set by the timing of the signal from the signal source 15 and its Q terminal output signal becomes "0". Therefore, the relay RL18 is again activated and its contacts r10 and r11 are restored to the position shown in FIG. 13. The Q terminal output signal of flip-flop 28 becomes "1" and is then applied to the data terminal D of shift register 25. The signal from the signal source 15 is applied to the clock terminal CK of shift register 25 and the Q terminal outputs are sequentially shifted. When all $Q_1$, $Q_2$, $Q_3$ terminal output signals become "1", the output signal of AND circuit 26 becomes "1" and thereby the flip-flop 27 is reset. The signal from the signal source 15 is applied to the control circuit 12 through the AND circuit 23.

When the signal from the signal source 15 is "0", the first constant current circuit 10 is driven by the output signal of inverting driver 13 to pull a constant current. When the signal is "1", the second constant current circuit 11 is driven by the output signal of the non-inverting driver 14 to pull the constant current. Therefore, the ringing signal of constant current in the positive or negative direction is transmitted to the telephone set 1 through the contacts r10 and r11.

Since the impedance of telephone set 1 is large during the OFF-hook state, an output voltage $V_{out}$ produced by a composite impedance (including the impedance of telephone set and subscriber line impedance) and a constant current has a large amplitude between the power supply voltages $-V_{SS}$, $+V_{DD}$. Since the reference voltage $V_{th}$ is set in accordance with the relation $+V_{DD} > 0 > V_{th} > -V_{SS}$, the comparison output signal becomes "0" and "1" in the ringing signal period by comparing the output voltage $V_{out}$ with the reference voltage $V_{th}$ in the comparator 20. When the comparison output signal "0" is applied to the clear terminal CL of shift register 25 and shift register 25 is cleared, all output signals of $Q_1$, $Q_2$, $Q_3$ terminals become "0". Therefore, the output signal of AND circuit 26 continues to be "0" and the flip-flop 27 continues in its set state. Thereby, the Q terminal outputs of flip-flop 28 are kept at the previous state.

Since the impedance of telephone set 1 becomes small during the OFF-hook state, the amplitude of the output voltage $V_{out}$ also becomes small. Since the comparison output signal of comparator 20 is formed by continuation of the "1" signal, the shift register 25 is not cleared. Accordingly, when "1" in the shift register 25 is shifted and all output signals of $Q_1$, $Q_2$, $Q_3$ terminals becomes "1", an output signal of AND circuit 26 becomes "1" and the flip-flop 27 is reset. Thereby, the flip-flop 28 is cleared, the output signal of Q terminal becomes "1", the relay RL18 is operated and the contacts r10 and r11 are changed from the position shown in FIG. 13. Since the output signal of Q terminal of flip-flop 28 becomes "0", the signal from the signal source 15 is not applied to the control circuit 12. Accordingly, transmission of the ringing signal is suspended and the telephone set 1 is connected to the network of switching equipment through the circuit having the BSCH functions (not illustrated in FIG. 13).

Figure 14:
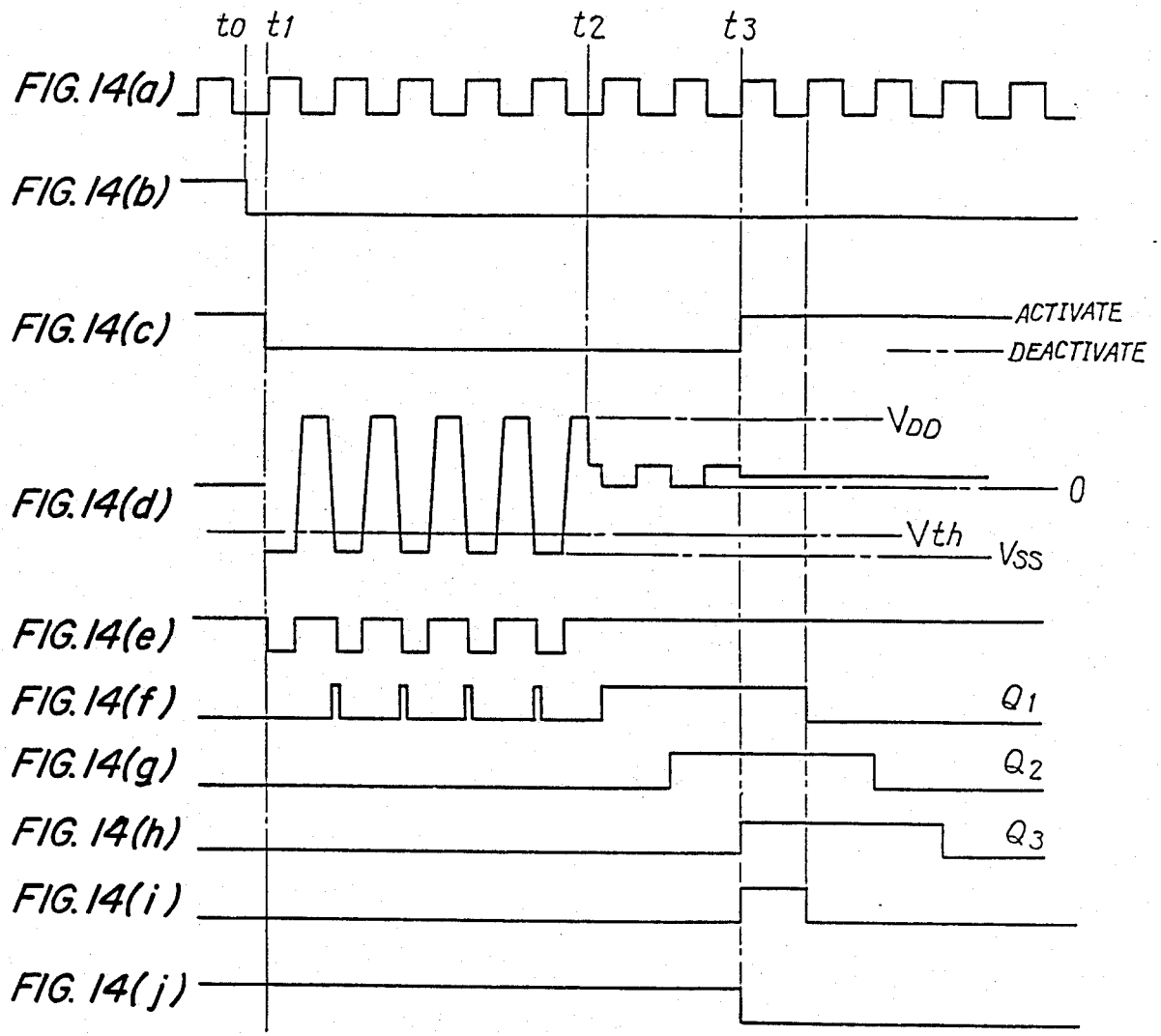
FIGS. 14(a), 14(b), 14(c), 14(d), 14(e), 14(f), 14(g), 14(h), 14(i) and 14(j) are graphs of waveforms associated with the circuit of FIG. 13.

FIGS. 14(a)-14(j) are graphs explaining the operation of the various signals of the circuit FIG. 13. When the ringing control signal SD becomes "0", as indicated in FIG. 14(b) at time $t_0$, the flip-flop 28 is set in accordance with the timing of the signal from the signal source 15 (shown in FIG. 14(a)). Relay RL18 resets at time t1 as indicated in FIG. 14(c) and the contacts r10 and r11 are connected as shown in FIG. 13. The constant current circuits 10, 11 are alternately controlled by the control circuit 12 to send the constant current ringing signal. The output voltage $V_{out}$ has an amplitude between the power supply voltages $-V_{SS}$, $+V_{DD}$ as indicated in FIG. 14(d). Since the impedance of the telephone set is large, the output voltage $V_{out}$ tends to become large, but it does not exceed the power supply voltages $-V_{SS}$ and $+V_{DD}$ since it is clamped at those levels, and has a maximum amplitude between the power supply voltages $-V_{SS}$ and $V_{DD}$.

When the reference voltage $V_{th}$ is set as indicated in FIG. 14(d), the comparison output signal of the comparator 20 becomes "0" when the output voltage $V_{out}$ is at a level close to the power supply voltage $V_{SS}$ as indicated in FIG. 14(e). Accordingly, since the shift register 25 is cleared by the comparison output signal at level "0", the output signal of the $Q_1$ terminal of shift register 25 becomes the pulse as indicated in FIG. 14(f), and the output signals of other $Q_2$, $Q_3$ terminals become "0".

When the OFF-hook state occurs at time $t_2$, the impedance of the telephone set becomes small, the amplitude of output voltage $V_{out}$ becomes small and $V_{out}$ becomes larger than 0 ($V_{out} > 0$). The comparison output signal of comparator 25 is applied as a continuation of "1" because $V_{out} > V_{th}$. Accordingly, since the shift register 24 is not cleared, the signal "1" applied to the data terminal D is shifted, the outputs of the $Q_1$, $Q_2$, $Q_3$ terminals become all "1"s at time $t_3$, as indicated in FIGS. 14(f), 14(g) and 14(h), and the output signal of AND circuit 26 becomes "1" as indicated in 14(i).

Since the signal "1" is applied to the reset terminal R of flip-flop 27, the flip-flop 27 is reset and the output signal of its Q terminal becomes "0" as indicated in FIG. 14(j). This "0" signal clears the flop-flop 28 because it is applied to its clear terminal CL, since the output signal of its Q terminal becomes "1". The relay RL18 is operated as indicated in FIG. 14(c) and the contacts r10 and r11 thereof are connected opposite to the position shown in FIG. 13.

When flop-flop 28 is cleared, the output signal at the Q terminal becomes "0", the AND circuit 23 closes and the signal is no longer applied to the control circuit 12 from the signal source 15. This causes the ringing signal to be stopped. When contacts r10 and r11 of the relay RL18 switch are positioned, the telephone set 1 is connected to the switching equipment network through the circuit having the BSHC functions (not illustrated).

The operation of relay RL18 and its relation to the transmission and termination of transmission of the ringing signal can be reversed from the operation shown in FIG. 13, by changing the control of relay RL18. The structure of FIG. 13 can be used to send the ringing signal by operation of relay RL18 and the signal can be suspended by restoring the relay to its original position. The shift register 25 can be used as an ordinary counter. The specified count value can be selected depending on the relationship between the period of the clock signal and the ring trip time.

As previously explained, in the ringing signal transmission circuit, the Off-hook state is detected (in response to the ringing signal) by sensing the change of value of the output voltage during the OFF-hook and ON-hook conditions. Since the count circuit 21 and the logic circuit 22 can be formed by digital circuits, an integrated circuit can also be employed, resulting in the advantage that the subscriber circuit can be further reduced in size.

According to the structure of the circuit in FIG. 13, the ringing signal transmission timing $t_1$ appears simultaneously with the restoration timing $t_1$ of relay RL18. Moreover, the transmission/stop timing $t_3$ of the ringing signal also appears simultaneously with the operation timing $t_3$ of relay RL18. Therefore, the ringing signal is sent through the BSHC function circuit 3 when the relay contact r11 and r12 open or close and thus may generate noise.

Figure 15:
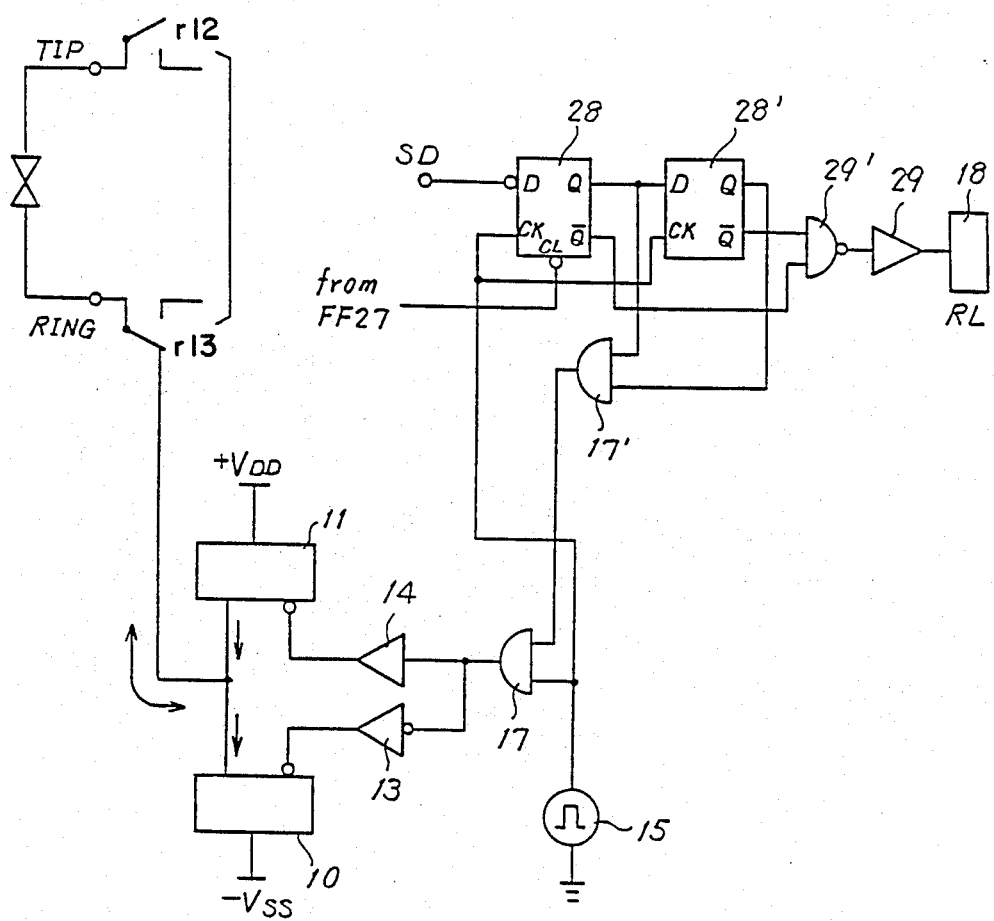
FIG. 15 is a modified circuit diagram of FIG. 17.

A circuit which prevents generation of such noise is shown in FIG. 15. In FIG. 15, the flip-flop 28', AND circuit 17' and NAND circuit 29' are added to the circuit structure of FIG. 13, forming a sequence circuit. This sequence circuit controls the relay in such a way as to change the state of connection of the relay contacts r12 and r13 as indicated in FIG. 15, applying an output of signal source 15 to the inverting driver 13 and non-inverting driver 14 and transmitting the ringing signal current. The sequence circuit also controls the relay RL18 so that the relay contacts r12 and r13 are switched (opposite to the position shown in FIG. 15) after transmission of ringing signal current is suspended by cutting off the output of signal source 15 to the inverting driver 13 and non-inverting driver 14.

Operations of the sequence circuit will be explained hereunder with reference to FIG. 16(a)-16(h).

Figure 16:
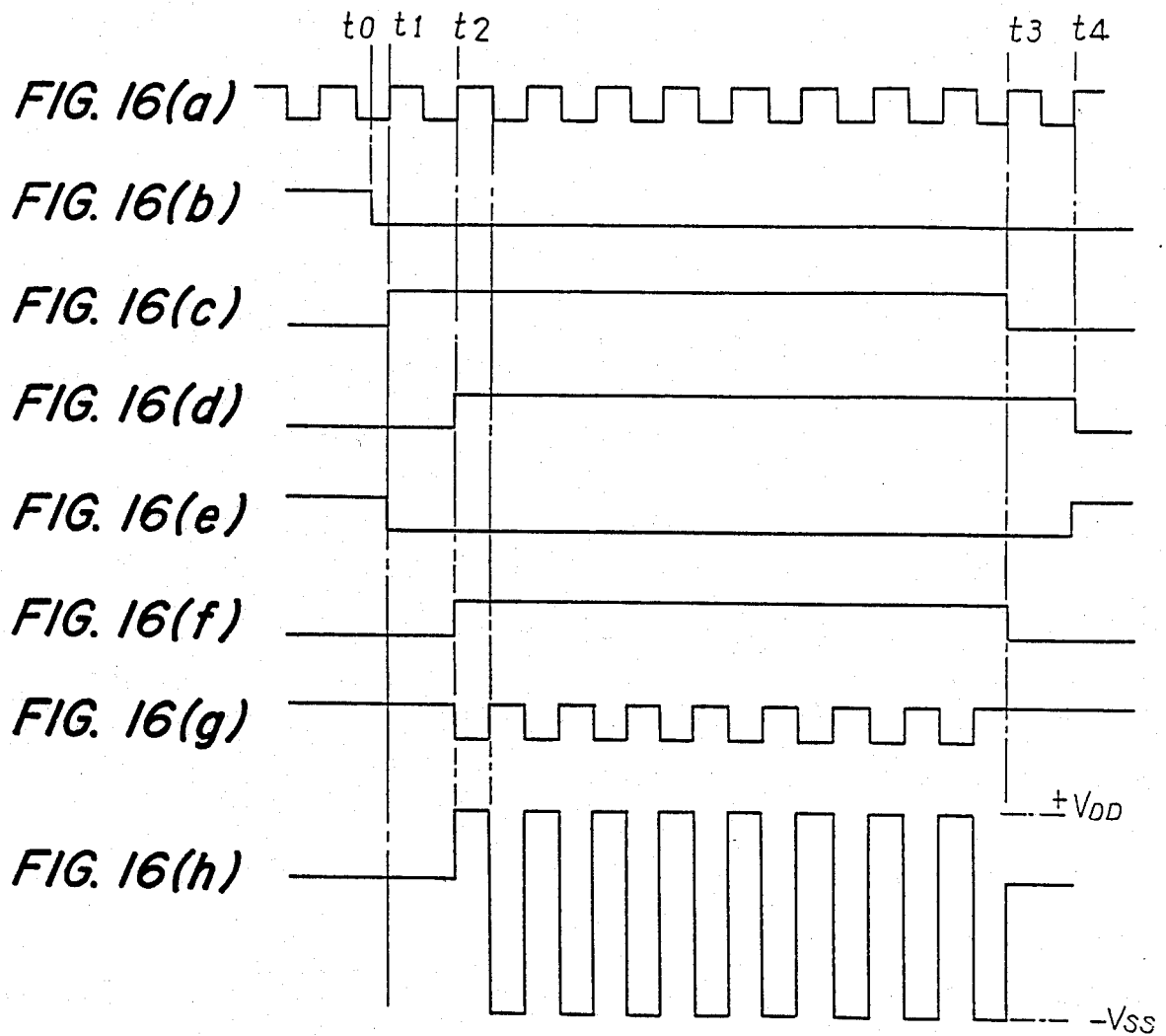
FIGS. 16(a), 16(b), 16(c), 16(d), 16(e) and 16(f) are graphs of waveforms associated with the circuit of FIG. 15.

When the ringing control signal SD becomes "0" as indicated in FIG. 16(b) at time $t_0$, the output signal of Q terminal of flip-flop 28 becomes "1" as indicated in FIG. 21(c) at time $t_1$. Additionally, the signal from the signal source 15, shown in FIG. 16(a), rises at time $t_1$. The output signal of NAND circuit 29' becomes "0" as indicated in FIG. 16(e) and the output of amplifier 29 also becomes "0" and thereby the contacts r12 and r13 of relay RL18 are connected as shown in FIG. 15. The output signal of the Q terminal of flip-flop 28' also becomes "1" as indicated in FIG. 21(d) at time $t_2$, where the next signal rises. As a result, the output signal of AND circuit 17' becomes "1" as indicated in FIG. 16(f) and the signal from the signal source 15 is applied to the inverting driver 13 and non-inverting driver 14, as indicated in FIG. 16(g), through the AND circuit 17. When the output signal of NAND circuit 17 is "0", the inverting driver 13 operates and a constant current is pulled to the current mirror circuit 10, to which the power supply voltage $-V_{SS}$ is applied from the telephone set 1. The non-inverting driver 14 operates when the output signal of AND circuit 17 is "1", and a constant current is transmitted to the side of telephone set 1 by the current mirror circuit 11, to which the power supply voltage $+V_{DD}$ is applied. Accordingly, the ringing signal voltage indicated in FIG. 16(h) is transmitted from the current mirror circuits 10, 11. Since the current mirror circuits 10, 11 are operating and the ringing signal is transmitted after the position of contacts r12 and r13 are changed to the position shown in FIG. 15, the generation of noise can be reduced.

As described above, the flip-flop 28 is reset and the output of the Q terminal thereof becomes "0" as indicated in FIG. 16(c) at time $t_3$ due to detection of OFF-hook condition of telephone set 1 corresponding to the ringing signal. When this occurs, the output signal of AND circuit 17' becomes "0" as indicated in FIG. 16(f), the output of signal source 15 is cut off by the AND circuit 17 and the operations of current mirror circuits 10, 11 are also suspended. Accordingly, transmission of the ringing signal is suspended. Since the output signal of Q terminal of flip-flop 28' also becomes "0" as indicated in FIG. 16(d) at time $t_4$ where the next signal rises, the output signal of NAND circuit becomes "1" as indicated in FIG. 16(e) and the relay RL18 is operated by the output signal of amplifier 29. In addition, since the contact of relay RL18 switches positions (opposite to the position indicated in FIG. 15), the telephone set 1 is connected to the switching equipment network through the circuit 3 having the BSHC functions, forming the speech path to the call originating telephone set.

Figure 17:
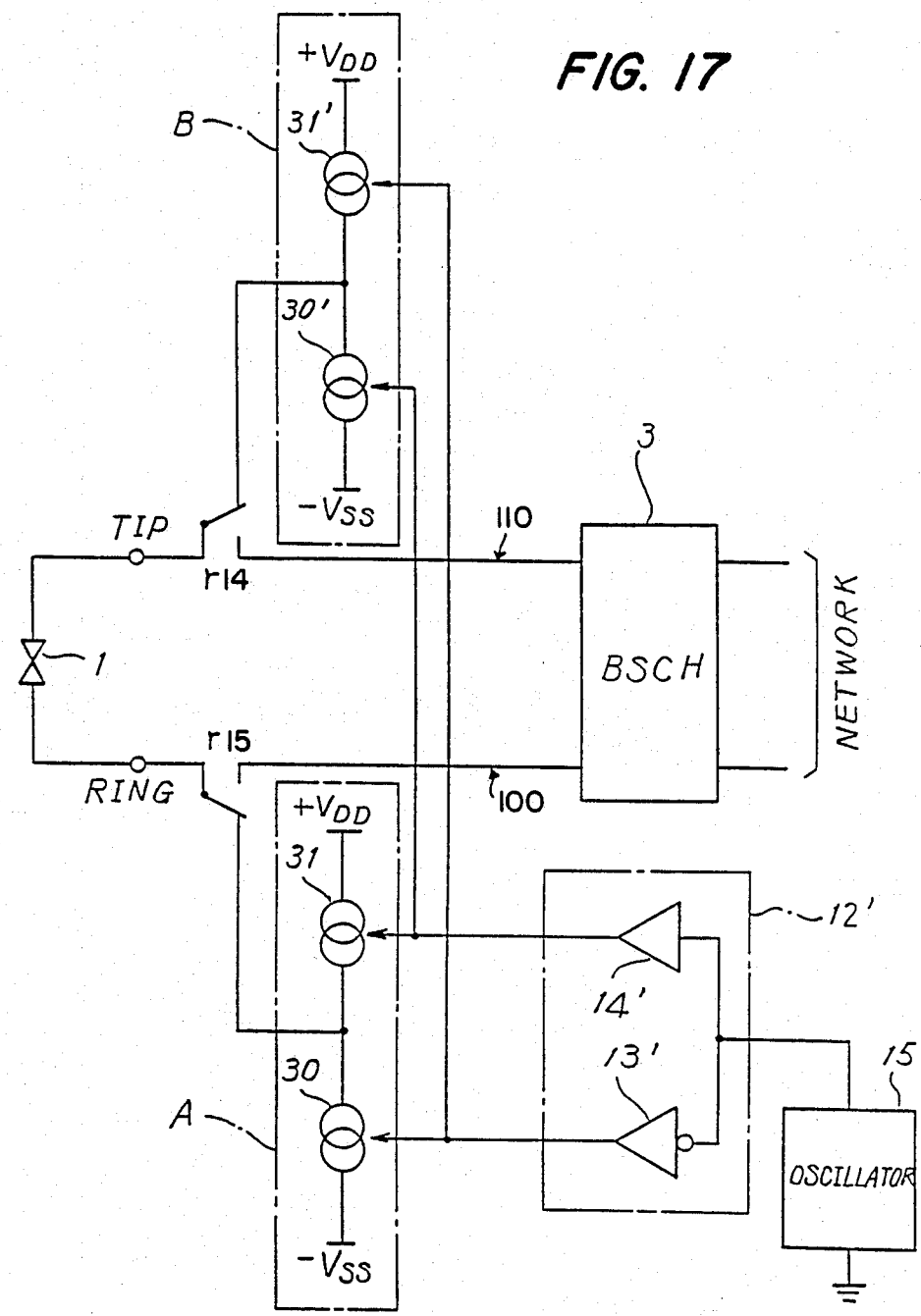
FIG. 17 is a block diagram of another ringing circuit of the present invention.

As explained above, the present invention provides the ringing signal transmission circuit suited for use in an LSI, and further provides a ring trip circuit for the same. However, the ringing signal transmitting circuit indicated in FIG. 4, FIG. 5, FIG. 6, FIG. 8 is provided only to the one of the TIP, RING lines of subscriber line. Therefore, the ringing signal current $I_{out}$ sent from either the TIP or RING line is generated between the power supply $+V_{DD}$ and ground and between the power supply $-V_{SS}$ and ground and the power supply voltages $+V_{DD}$ and $-V_{SS}$ must be set higher in order to obtain the specified current value. Accordingly, the chip area must be wide in order to attain the desired dielectric strength when forming the circuit on an LSI. Because of this increase in size, it is not desirable to set the power supply voltages $+V_{DD}$, $-V_{SS}$. FIG. 17 shows a ringing circuit which takes this requirement into consideration.

The ringing circuit of FIG. 17 includes a first constant current circuit A comprising constant current sources 30 and 31. Second constant current circuit B is identical to the first constant current circuit A and includes constant current sources 30' and 31. First constant current circuit A is connectable, through the contact r15, to wire 100 of a 2-wire subscriber line connected to circuit 3. Second constant current circuit B is connectable to the wire 110 of the 2-wire subscriber line via contact r16.

Control circuit 12' is provided for alternately activating the circuits with the signal from signal source 15. Constant current sources 30 and 31' are operated simultaneously by the output signal from the inverting driver 13', while constant current sources 31 and 30' are operated simultaneously by the output signal from the non-inverting driver 14'.

When the first constant current circuit A draws a current, the ringing signal is transmitted as a differential signal to the telephone set 1 connected to the terminals TIP, RING through the contact rl. When the signal from signal source 15 is negative, for example, constant current sources 30 and 31' are operated simultaneously and a constant current is transmitted from constant current source 31', to which power supply voltage $+V_{DD}$ is applied. As a result, a constant current is pulled by the constant current source 30, to which power supply voltage $-V_{SS}$ is applied. When the signal from signal source 15 is positive, constant current sources 31 and 30' are operated simultaneously. A constant current is transmitted from the constant current source 31, to which the power supply voltage $+V_{DD}$ is applied, and a constant current is pulled by the constant current source 30', to which the power supply voltage $-V_{SS}$ is applied. Accordingly, the ringing signal (as a differential signal) is transmitted to the telephone set 1. A sum of the absolute values of the respective power supply voltages $|V_{DD}|+|V_{SS}|$ of the first constant current circuit A and the second constant current circuit B is applied to the telephone set 1, transmitting the ringing signal. The ringing signal is sufficient to ring the bell of telephone set 1 even when the respective power supply voltages are lowered.

Figure 18:
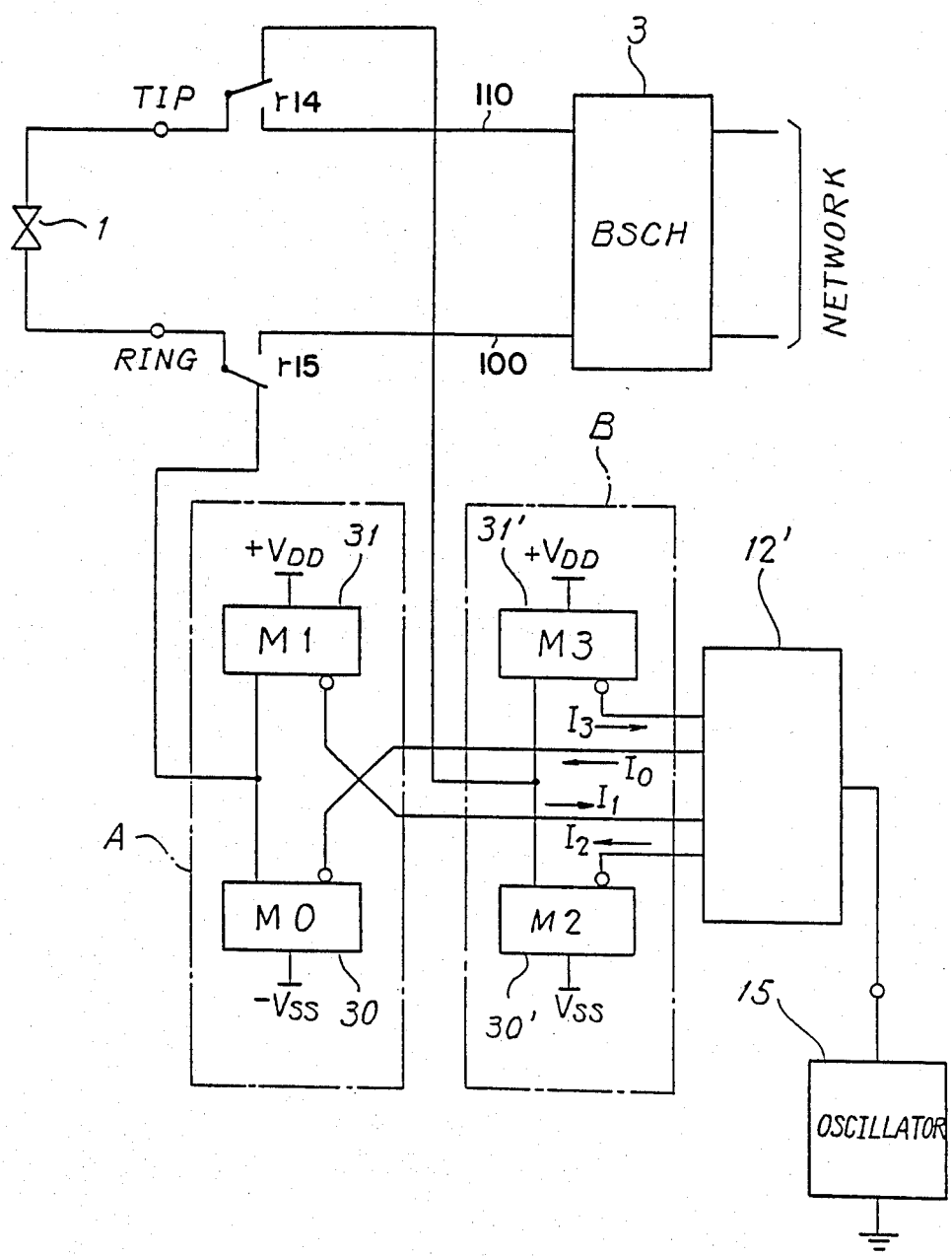
FIG. 18 is a block diagram of FIG. 17.

FIG. 18 is a block diagram of the structure of FIG. 17, wherein current mirror circuits are used as the constant current sources. The numbers of FIG. 18 correspond to like items in FIG. 17. The control circuit 12' directs the flow of currents $I_0$, $I_3$ (in the direction of the arrows) during the positive period of the signal sent from the signal source 15. Current mirror circuit 30 of the constant current circuit A pulls a current, which is proportional $I_0$, and current mirror circuit 31' of constant current circuit B transmits a current which is proportional to $I_3$. In this case, since the currents $I_1$, $I_2$ are set to zero, a current flows to the telephone set 1 from the terminal TIP side and the ringing signal is transmitted.

During the period when the signal from signal source 15 is negative, the control circuit 12' directs the flow of current $I_1$, $I_2$ (in the direction of the arrows). Thus, a current flows to the telephone set 1 from the terminal RING side in proportion to the currents $I_1$, $I_2$ and the ringing signal to be pulled to the terminal TIP side is transmitted. As explained previously, the ringing signal, which corresponds to the period of the signal transmitted from the signal source 15, is transmitted through contacts r14 and r15.

First and second constant current circuits A and B supply constant current to the telephone set 1 and subscriber line. The output voltage is proportional to the load impedance of the telephone set 1 and the subscriber line. However, even if the load impedance is large, the output voltage rise does not exceed the power supply voltages $-V_{SS}$, $+V_{DD}$, thus assuring safe operation. In addition, a current limiting resistor is not required because only a predetermined constant current flows, even in a grounding condition.

When the OFF-hook state is entered in response to the ringing signal, the impedance of telephone set 1 becomes almost zero and thereby the output voltage is lowered. Accordingly, the Off-hook state is detected, the relay contacts r14 and r15 are operated and transmission of ringing signal is suspended, thereby connecting the telephone set 1 to the network through the circuit 3 having the BSHC functions.

Figure 19:
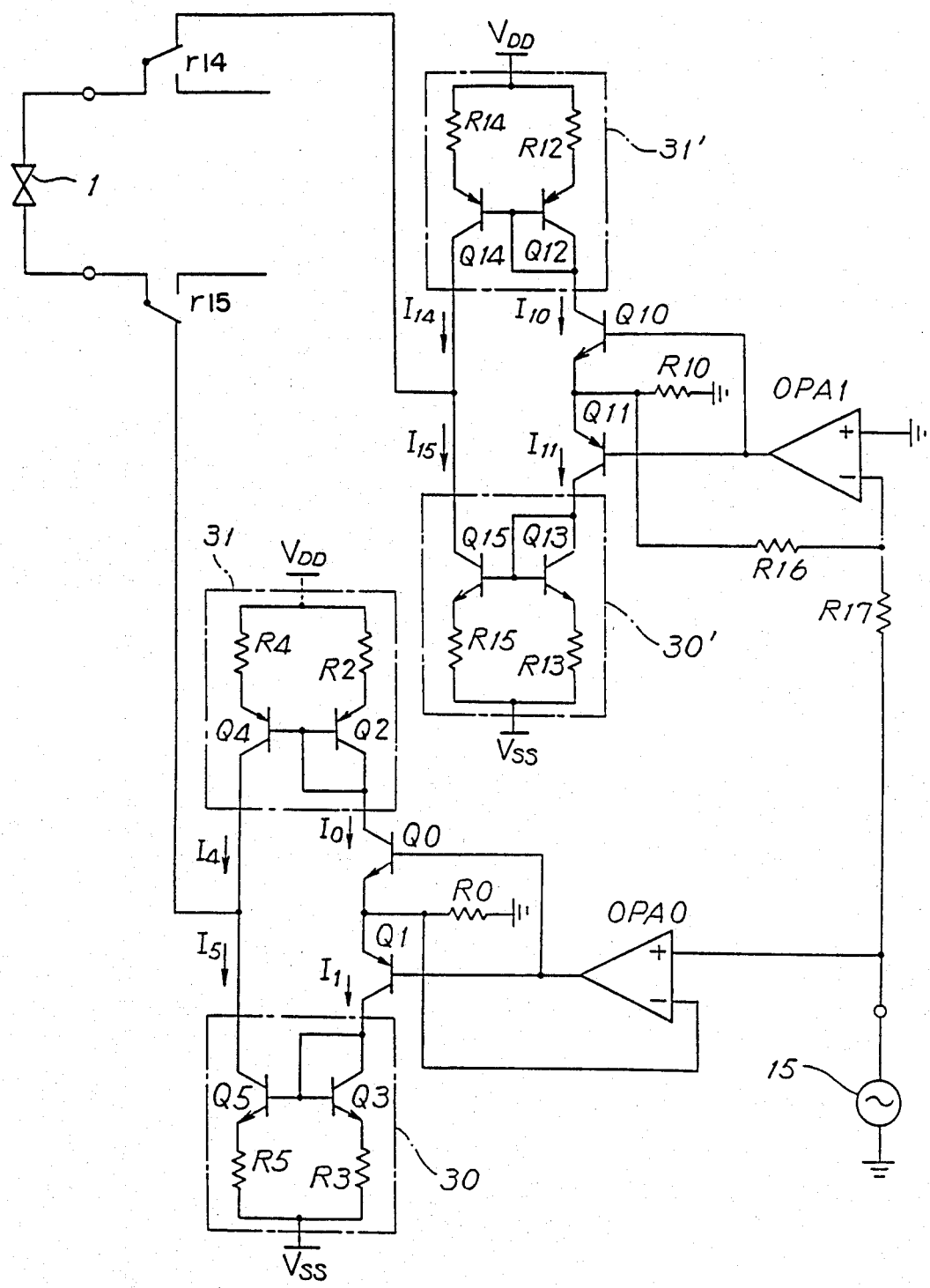
FIG. 19 is a detailed circuit diagram of FIG. 18.

FIG. 19 is a detail circuit diagram of FIG. 18. Current mirror circuit 30 is formed with transistors Q3, Q5 and resistors R3, R5 and current mirror circuit 31 is formed with transistors Q2, Q4 and resistors R2, R4. Current mirror circuit 30' is formed using transistors Q13, Q15 and resistors R13, R15 and current mirror circuit 31' is formed using transistors Q12, Q14 and resistors R12, R14. The control circuit 12' includes operational amplifiers OPA0, OPA1, transistors Q0, Q1, Q10, Q11 and resistors R0, R10, R16, R17.

The current mirror circuits 30, 31, 30', 31' allow current proportional to the current flowing to the input side transistor of each mirror circuit to flow to the output side transistor of each mirror circuit. For example, in the current mirror circuit 30, since the relation between the current $I_1$ flowing into the input side transistor Q3 and the current $I_5$ flowing into the output side transistor Q5 is expressed as follows:

$$I_5 = (R3/R5) I_1 \qquad (7)$$

a large output current can be controlled with less input current by selecting the resistors R3, R5 such that $R3 > R5$.

The operational amplifiers OPA0, OPA1 provide an output which makes the input voltage of non-inverting input terminal (+) equal to the input voltage of the inverting input terminal (−). Thus, when the input signal from the signal source 15 to the non-inverting input terminal (+) of operational amplifier OPA0 is positive, the transistor Q0 is ON while the transistor Q1 becomes OFF and a current $I_1$ flows so that the voltage across the resistor R0 becomes positive. When the input signal is negative, the transistor Q0 is OFF and transistor Q1 is ON, and a current $I_1$ flows so that a voltage across the resistor R0 becomes negative and is of the same value as the input signal. The currents $I_3$, $I_5$ which are proportional to these currents $I_0$, $I_1$ flow to the telephone set 1 through the contact r14 and r15.

When the input signal to the inverting input terminal (−) of the operational amplifier OPA1 from the signal source 15 is positive, the transistor Q11 is ON and transistor Q10 is OFF. Thus, a negative voltage appears across the resistor R10 and a current $I_{11}$ flows, since the non-inverting input terminal (+) is grounded. Current $I_{11}$ causes the inverting input terminal (−) to be equal to the grounding potential. When the input signal is negative, the transistor Q10 is ON and transistor Q11 is OFF. This causes a positive voltage across the resistor R10 and a current $I_{10}$ flows. Currents $I_{14}$, $I_{15}$ which are proportional to the currents $I_{18}$, $I_{11}$, flow into the telephone set through the contacts r14 and r15. In this case, the following relations are true:

$$I_4 = I_{15}, \quad I_5 = I_{14}$$

Figure 20A:
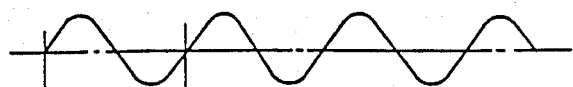
FIGS. 20(a), 20(b), 20(c), 20(d), 20(e), 20(f), 20(g) and 20(h) are graphs of waveforms associated with the circuit of FIG. 19.
Figure 20B:
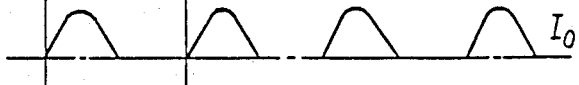
Figure 20C:
Figure 20D:
Figure 20E:
Figure 20F:
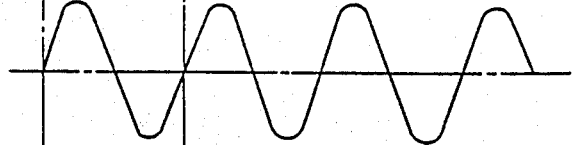

FIGS. 20(a)–20(h) are graphs of the signals developed by the circuit of FIG. 19. FIG. 20(a) is the signal from the signal source 15. During the positive period of this signal, the currents $I_0$, $I_{11}$ flow as indicated by FIGS. 20(b) and 20(e), along with the output of operational amplifiers OPA0, OPA1. Thus the currents $I_4$, $I_{15}$ flow in proportion to such signals. During the negative period of the signal from signal source 15, the currents $I_1$, $I_{10}$ flow as indicated in FIGS. 20(c) and 20(d), along with the output of the operational amplifiers OPA0, OPA1. Accordingly the currents $I_5$, $I_{14}$ flow in proportion to such signal, and the ringing signal indicated in FIG. 20(f) is transmitted to the telephone set 1.

Figure 20G:
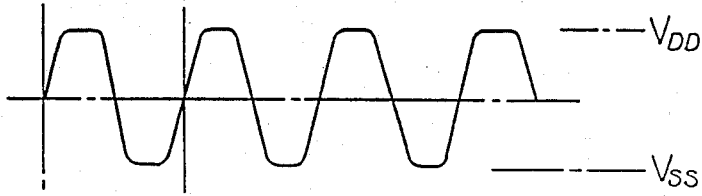
Figure 20H:
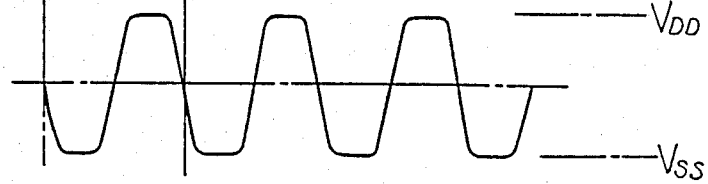

The output voltage of the first constant current circuit is clamped within the power supply voltages $+V_{DD}$ and $-V_{SS}$ even if the load impedance is large, as indicated in FIG. 20(g), assuring safe operation. In addition, an output voltage of the second constant current circuit is also clamped within the power supply voltages $+V_{DD}$, $-V_{SS}$ as indicated in FIG. 20(h).

A voltage of about $|V_{D}D| + |-V_{S}S|$ is applied, by the power supply of the first constant current circuit and second constant current circuit, to the telephone set 1 connected to the terminals TIP and RING through the subscriber line. The power supply voltages $V_{DD}$, $V_{SS}$ can be reduced by ½ in comparison with the case where the ringing signal is transmitted only from one line of the two-line subscriber line.

Figure 21:
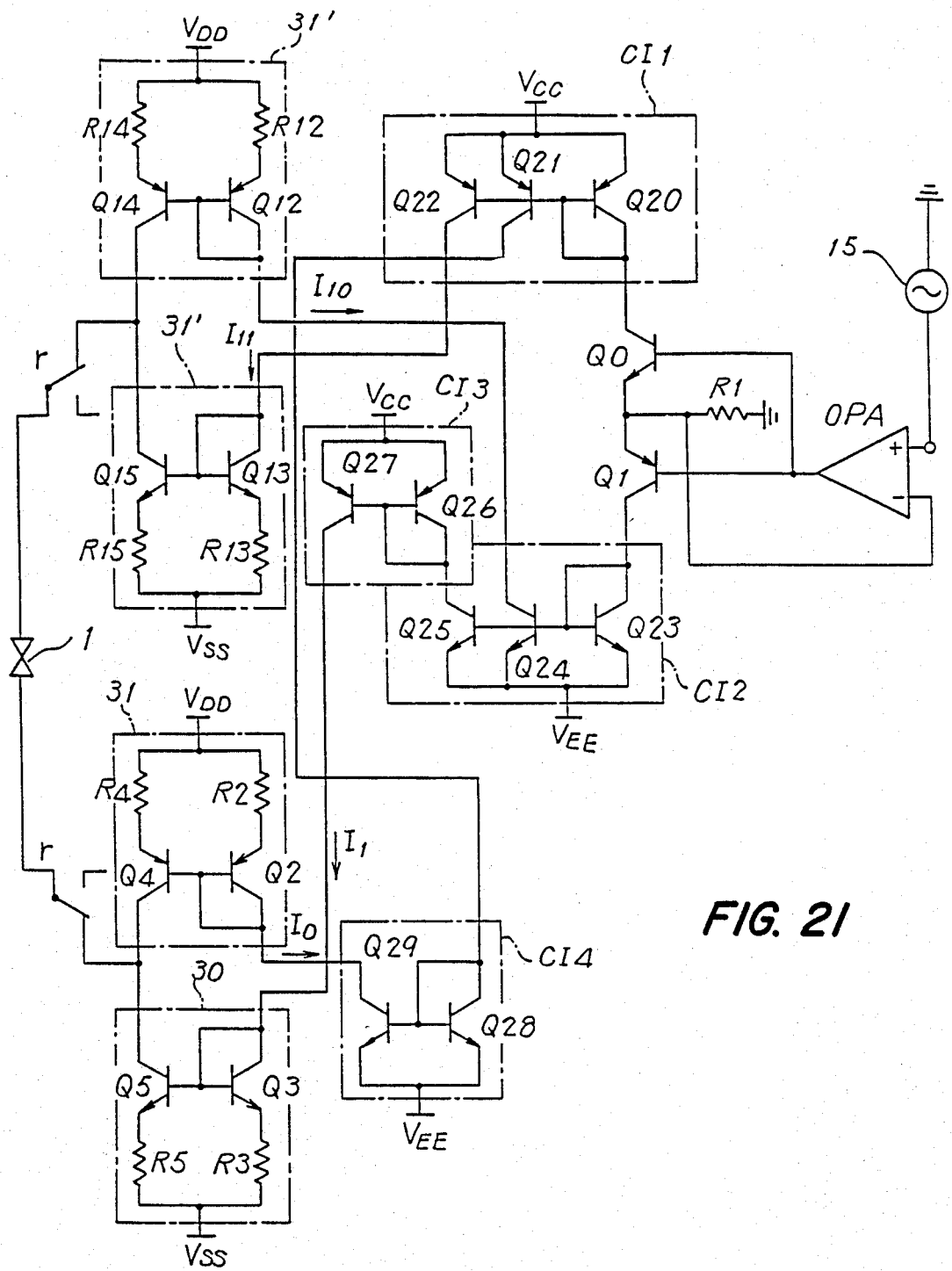
FIG. 21 is a modified circuit diagram of FIG. 17.

FIG. 21 is a circuit diagram of a modification of FIG. 19. This embodiment realizes current inversion using a current mirror circuit. The transistors Q0, Q1 are alternately turned ON and OFF by an output of operational amplifier OPA in accordance with the signal from the signal source 15. When the signal is positive, transistor Q0 turns ON, a current flows to the transistor Q20 in the input side of the current mirror circuit CI$_1$, and a current which is proportional to this current flows into the transistors Q21, Q22 on the output side. A current flowing into transistor Q21 also flows into transistor Q28 on the input side of current mirror circuit C14 and a current which is proportional to such current flows into transistor Q29 in the output side. This current becomes a current $I_0$ flowing into the transistor Q2 of the constant current source 31 of the first constant current circuit 0. A current flowing into the transistor Q22 of the current mirror circuit CI1 becomes the current $I_{11}$ flowing into the transistor Q13 of the constant current source 30'. Accordingly, a current produced by the constant current source 31 flows to constant current source 30'.

When the signal from the signal source 15 is negative, transistor Q1 becomes ON and thereby a current flows into transistor Q23 in the input side of the current mirror circuit CI2 and a current proportional to such current flows into transistors Q24, Q25 on the output side. A current flowing into this transistor Q24 becomes a current flowing to the transistor Q12 of constant current source 31'. Current flowing into transistor Q25 flows into transistor Q26 on the input side of the current mirror circuit CI3 and a current proportional to such current flows into the transistor Q27 on the output side. This current becomes a current $I_1$ flowing to the transistor Q3 of the constant current source 30. Accordingly, the current sent from the constant current source 31' flows to constant current source 30.

With repetition of this operation, the ringing signal is transmitted to the telephone set 1 through the contacts r16 and r17 and the output voltages of the first and second constant current circuits can be obtained, as in the case of the embodiment.

As explained above, the ringing signal transmission circuits shown in FIG. 17, FIG. 18, FIG. 19 and FIG. 20 connects the first and second constant current circuits A, B to the two wires of subscriber line and transmits the ringing signal respectively from the two wires of the subscriber line, thereby reducing the power supply voltages $+V_{DD}$, $-V_{SS}$ of the respective transmission circuit by ½ in comparison with the case where the ringing signal is sent from only a single wire. Accordingly, circuit structure having a low dielectric strength can be used. As a result, even a complicated circuit configuration can be formed on an LSI.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A ringing circuit transmitting a ringing signal at a predetermined frequency to a subscriber telephone set via first and second subscriber lines, comprising:
   first and second constant current sources supplying current to said first line, each of said first and second constant current sources comprising a current mirror circuit;
   a reference signal source outputting a pulse signal at a frequency corresponding to said ringing signal frequency; and
   a control circuit, connected to said first and second constant current sources and said reference signal source, and alternately activating said first and second constant current sources in response to the pulsed signal.

2. A ringing circuit according to claim 1, wherein said control circuit comprises:
   a first driver, connected to said first constant current source, and activating said first constant current source during a first portion of said pulsed signal; and
   a second drive, connected to said second constant current source, and activating said second constant current source during a second portion of said pulsed signal.

3. A ringing circuit according to claim 2, wherein said ringing circuit includes a ground terminal and said first and second current mirror circuits each have an input, said first driver comprising first switch means for connecting the input of said first current mirror circuit to the ground terminal, and said second driver comprising second switch means for connecting the input of said second mirror circuit to the ground terminal.

4. A ringing circuit according to claim 1, further comprising third and fourth constant current sources coupled to said second subscriber line and said control circuit, said control circuit simultaneously activating said first and said fourth constant current sources during a first portion of said pulsed signal, and simultaneously activating said second and third constant current sources during a second portion of said pulsed signal.

5. A ringing circuit according to claim 4, wherein said, third and fourth constant current sources are current mirror circuits, respectively.

6. A ringing circuit according to claim 5, wherein said control circuit comprises:
   a first driver, connected to said first and fourth constant current sources, and simultaneously activating said first and fourth constant current sources during the first portion of said pulsed signal; and
   a second drive, connected to said second and third constant current sources, and simultaneously activating said second and third constant current sources during the second portion of said pulsed signal.

7. A ringing circuit according to claim 6, wherein said first, second, third and fourth constant current sources each have an input and said first driver comprises switch means for connecting the inputs of the said first and fourth constant current sources to the ground terminal, and said second driver comprises switch means for connecting the inputs of said second and third constant current sources to the ground terminal.

8. A ringing circuit according to claim 6, wherein said first and second drivers comprise:
   first switch means having fifth and sixth current mirror circuits each having an input:
   second switch means for connecting the input of said fifth current mirror circuit to the ground terminal and for driving said first and fourth constant current sources; and
   third switch means for connecting the input of said sixth current mirror circuit to the ground terminal and for driving said second and third constant current sources.

9. A ringing circuit transmitting a ringing signal, having a frequency, to a subscriber telephone set via first and second subscriber lines, comprising:
   first and second constant current sources coupled to the first subscriber line;
   third and fourth constant current sources coupled to the first subscriber line;
   a reference signal source outputting a pulsed signal of a frequency corresponding to said ringing signal frequency; and
   a control circuit, connected to said first through fourth constant current sources and said reference signal source, and alternately activating said first constant current source and said fourth constant current source simultaneously and activating said second constant current source and said third constant current source simultaneously depending on the frequency of the pulsed signal from the reference signal source.

10. A ring trip circuit comprising:
    first and second subscriber lines;
    a subscriber telephone set having an OFF hook state;

a first constant current source coupled to and drawing current from said first and second subscriber lines and outputting an output voltage;

a second constant current source coupled to and sending current to said first and second subscriber lines and outputting a second voltage;

a reference signal source outputting a pulsed signal of a frequency corresponding to a ringing signal frequency;

a control circuit, connected to said first and second constant current sources and said reference signal source, and alternately activating said first constant current source and second constant current source and transmitting the ringing signal to said subscriber telephone set via said first and second subscriber lines;

a relay having first and second contact positions, connecting said first and second constant current sources to said first and second subscriber lines in the first contact position, and disconnecting said first and second constant current sources from said first and second subscriber lines in the second contact position;

a comparator, coupled to said first and second constant current sources and said relay, and comparing the first and second output voltages of said first and second constant current sources with a reference voltage and outputting a control signal when said output voltage reaches a predetermined level;

a counter, coupled to said controller, said comparator, and said reference signal source which starts counting upon receipt of the control signal from said comparator;

detecting means for detecting whether an OFF-hook state exists by evaluating a count value of said counter and changing the position of the contact of said relay when the OFF-hook state is detected.

11. A ring trip circuit according to claim 10, wherein said detecting means comprises gate means for inhibiting transmission of the pulsed signal of said reference signal source to said first and second constant current sources.

12. A ring trip circuit according to claim 11, wherein said detecting means further comprises stop means for stopping operating of said first and second constant current sources by turning off said pulsed signal through control of said gate means when said detecting means detects the OFF-hook condition.

13. A ring trip circuit according to claim 12, further comprising sequence means for maintaining the positions of said relay contact and continuously controlling said gate means to suspend the operation of said first and second constant current sources by said stop means upon termination of said ringing signal.

14. A ring trip circuit according to claim 12, wherein said logic circuit comprises sequence means for driving said stop means when said detecting means detects the OFF-hook condition and for changing the position of said relay contact to disconnect said first and second subscriber lines from said first and second constant current sources.

* * * * *